(12) United States Patent
Noh et al.

(10) Patent No.: US 11,400,600 B2
(45) Date of Patent: Aug. 2, 2022

(54) MOBILE ROBOT AND METHOD OF CONTROLLING THE SAME

(71) Applicant: LG ELECTRONICS INC., Seoul (KR)

(72) Inventors: Dongki Noh, Seoul (KR); Jaekwang Lee, Seoul (KR); Seungwook Lim, Seoul (KR); Kahyung Choi, Seoul (KR); Gyuho Eoh, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 150 days.

(21) Appl. No.: 16/830,910

(22) Filed: Mar. 26, 2020

(65) Prior Publication Data
US 2020/0306983 A1 Oct. 1, 2020

(30) Foreign Application Priority Data
Mar. 27, 2019 (KR) .......................... 10-2019-0035039

(51) Int. Cl.
*B25J 9/16* (2006.01)
*B25J 13/08* (2006.01)
(Continued)

(52) U.S. Cl.
CPC .............. *B25J 9/1697* (2013.01); *B25J 9/161* (2013.01); *B25J 9/163* (2013.01); *B25J 13/08* (2013.01);
(Continued)

(58) Field of Classification Search
CPC . B25J 9/1697; B25J 9/161; B25J 9/163; B25J 13/08; B25J 19/022; B25J 19/04;
(Continued)

(56) References Cited

U.S. PATENT DOCUMENTS 8,209,144 B1 * 6/2012 Anguelov .............. G01C 15/00
702/150
9,513,107 B2 * 12/2016 Zweigle .................. G01S 7/003
(Continued)

FOREIGN PATENT DOCUMENTS

JP 2012-242967 A 12/2012
JP 2018-24598 A 2/2016
(Continued)

OTHER PUBLICATIONS

Jean-Emmanuel Deschaud, IMLS-SLAM: scan-to-model matching based on 3D data, 2018 IEEE International Conference on Robotics and Automation (ICRA), May 21-25, 2018, Brisbane, Australia, pp. 2480-2485 (Year: 2018).*

(Continued)

*Primary Examiner* — Jaime Figueroa
(74) *Attorney, Agent, or Firm* — Birch, Stewart, Kolasch & Birch, LLP

(57) ABSTRACT

A mobile robot includes a traveling unit configured to move a main body, a LiDAR sensor configured to acquire geometry information, a camera sensor configured to acquire an image of the outside of the main body, and a controller. The controller generates odometry information based on the geometry information acquired by the LiDAR sensor. The controller determines a current location of the mobile robot by performing feature matching between images acquired by the camera sensor based on the odometry information. The controller combines the information obtained by the camera sensor and the LiDAR sensor to accurately determine the current location of the mobile robot.

16 Claims, 14 Drawing Sheets

(51) Int. Cl.
  *B25J 19/02* (2006.01)
  *B25J 19/04* (2006.01)
  *B25J 11/00* (2006.01)
  *B25J 5/00* (2006.01)

(52) U.S. Cl.
  CPC ............ *B25J 19/022* (2013.01); *B25J 19/04* (2013.01); *B25J 5/007* (2013.01); *B25J 11/0085* (2013.01)

(58) Field of Classification Search
  CPC ....... G01C 21/206; G01C 22/00; G01S 17/58; G01S 17/86; G01S 17/89; G05D 1/0253; G05D 1/0274; G06K 9/00664; G06K 9/4604; G06K 9/6202
  USPC .................................................. 700/245–264
  See application file for complete search history.

(56) References Cited

U.S. PATENT DOCUMENTS

| | | | |
|---|---|---|---|
| 9,870,624 B1* | 1/2018 | Narang | G06T 7/55 |
| 10,096,129 B2* | 10/2018 | Narang | G06T 7/55 |
| 10,500,722 B2* | 12/2019 | Vicenti | G05D 1/0219 |
| 10,539,676 B2* | 1/2020 | Li | G06K 9/00791 |
| 2009/0312871 A1* | 12/2009 | Lee | G05D 1/0234 700/259 |
| 2017/0048816 A1* | 2/2017 | Myeong | G06T 7/75 |
| 2017/0239813 A1* | 8/2017 | Vicenti | G05D 1/0272 |
| 2017/0361468 A1* | 12/2017 | Cheuvront | A47L 9/2805 |
| 2018/0204338 A1 | 7/2018 | Narang et al. | |
| 2018/0275277 A1* | 9/2018 | Li | G01S 17/86 |
| 2019/0204092 A1* | 7/2019 | Wheeler | G05D 1/027 |
| 2021/0089040 A1* | 3/2021 | Ebrahimi Afrouzi | A47L 9/2894 |

FOREIGN PATENT DOCUMENTS

| | | |
|---|---|---|
| JP | 2016-162013 A | 9/2016 |
| JP | 2017-054475 A | 3/2017 |
| JP | 2017-117386 A | 6/2017 |
| JP | 2018-17826 A | 2/2018 |
| JP | 2018-156538 A | 10/2018 |
| KR | 10-0785784 | 12/2007 |
| KR | 10-2010-0104581 | 9/2010 |
| KR | 10-1319526 | 10/2013 |
| KR | 10-1738750 | 5/2017 |
| KR | 10-1956447 | 3/2019 |

OTHER PUBLICATIONS

Office Action, dated Apr. 21, 2021, issued in Japanese Patent Application No. 2020-058968 (2 pages).
PCT International Search Report, dated Aug. 31, 2020, issued in International Application No. PCT/KR2020/004147 (3 pages).

* cited by examiner

MOBILE ROBOT AND METHOD OF CONTROLLING THE SAME

CROSS-REFERENCE TO RELATED APPLICATION

This application claims the benefit of priority of Korean Patent Application No. 10-2019-0035039, filed on Mar. 27, 2019 in the Korean Intellectual Property Office, the disclosure of which is incorporated herein by reference in its entirety.

BACKGROUND

1. Field

The present disclosure relates to a mobile robot and a method of controlling the same, and more particularly to technology of a mobile robot creating or learning a map or recognizing a position on the map.

2. Description of the Related Art

Robots have been developed for industrial purposes and have taken charge of a portion of factory automation. In recent years, the number of fields in which robots are utilized has increased. As a result, a medical robot and an aerospace robot have been developed. In addition, a home robot usable at home is being manufactured. Among such robots, a robot capable of autonomously traveling is called a mobile robot.

A typical example of a mobile robot used at home is a robot cleaner. The robot cleaner is an apparatus that cleans a predetermined region by suctioning dust or foreign matter in the predetermined region while traveling autonomously.

The mobile robot is capable of moving autonomously and thus moving freely, and may be provided with a plurality of sensors for evading an obstacle, etc. during traveling in order to travel while evading the obstacle.

A map of a traveling zone must be accurately created in order to perform a predetermined task, such as cleaning, and the current location of the mobile robot on the map must be accurately determined in order to move to a specific point in the traveling zone.

In addition, when the location of the mobile robot that is traveling is forcibly changed due to external factors, the mobile robot cannot recognize the unknown current location based on traveling information at the preceding location. As an example, a kidnapping situation in which a user lifts and transfers the mobile robot that is traveling may occur.

Research has been conducted on various methods of continuously determining the current location of the mobile robot based on traveling information of the mobile robot at the preceding location during continuous movement of the mobile robot (information about movement direction and movement velocity, comparison between continuously obtained floor photographs, etc.) in order to recognize the current location of the mobile robot. In addition, research has been conducted on various methods of the mobile robot creating and learning a map by itself.

In addition, technologies of the mobile robot recognizing an unknown current location using an image captured through a camera at the current location have been proposed.

A prior document (Korean Patent Application Publication No. 10-2010-0104581 published on Sep. 29, 2010) discloses technology of creating a three-dimensional map using feature points extracted from an image captured in a traveling zone and recognizing an unknown current location using a feature point based an image captured through a camera at the current location.

In the above prior document, the three-dimensional map is created using the feature points extracted from the image captured in the traveling zone, and three or more pairs of feature points matched with the feature points in the three-dimensional map are detected from among feature points in an image captured at the unknown current location. Subsequently, by using two-dimensional coordinates of three or more matched feature points in an image captured at the current location, three-dimensional coordinates of three or more matched feature points in the three-dimensional map, and information about the focal distance of the camera at the current location, the distance is calculated from the three or more matched feature points, whereby the current location is recognized.

A method of comparing any one image obtained by capturing the same portion in the traveling zone with a recognition image to recognize the location from the feature point of a specific point, as in the above prior document, has a problem in that accuracy in estimating the current location may vary due to environmental changes, such as presence or absence of lighting in the traveling zone, or illuminance change depending on the incidence angle or amount of sunlight.

SUMMARY

A method of comparing any one image obtained by capturing the same portion in the traveling zone with a recognition image to recognize the location from the feature point of a specific point, as in the above prior document, has a problem in that accuracy in estimating the current location may vary due to environmental changes, such as presence or absence of lighting in the traveling zone, illuminance change depending on the incidence angle or amount of sunlight, and object location change. It is an object of the present disclosure to provide location recognition and map creation technology robust to such environmental changes.

It is another object of the present disclosure to provide efficient and accurate technology for location recognition in a traveling zone capable of increasing a success rate of recognition of the current location of a mobile robot and estimating the current location with higher reliability.

It is another object of the present disclosure to provide simultaneous localization and mapping (SLAM) technology capable of complementarily using different kinds of data acquired utilizing different kinds of sensors.

It is a further object of the present disclosure to provide SLAM technology robust to various environmental changes, such as changes in illuminance and object location, by effectively combining vision-based location recognition technology using a camera and light detection and ranging (LiDAR)-based location recognition technology using a laser.

In order to accomplish the above and other objects, a mobile robot and a method of controlling the same according to an aspect of the present disclosure are capable of creating a map robust to environmental change and accurately recognizing the location on the map by complementarily using different kinds of data acquired utilizing different kinds of sensors.

In order to accomplish the above and other objects, a mobile robot and a method of controlling the same according to an aspect of the present disclosure are capable of realizing SLAM technology robust to various environmental changes, such as changes in illuminance and object location, by effectively combining vision-based location recognition technology using a camera and light detection and ranging (LiDAR)-based location recognition technology using a laser.

In order to accomplish the above and other objects, a mobile robot and a method of controlling the same according to an aspect of the present disclosure are capable of performing efficient traveling and cleaning based on a single map capable of coping with various environmental changes.

In accordance with an aspect of the present disclosure, the above and other objects can be accomplished by the provision of a mobile robot including a traveling unit configured to move a main body, a LiDAR sensor configured to acquire geometry information outside the main body, a camera sensor configured to acquire an image of the outside of the main body, and a controller configured to create odometry information based on sensing data of the LiDAR sensor and to perform feature matching between images input from the camera sensor base on the odometry information in order to estimate a current location, whereby the camera sensor and the LiDAR sensor may be effectively combined to accurately perform location estimation.

The mobile robot may further include a traveling sensor configured to sense a traveling state based on movement of the main body, wherein the controller may combine sensing data of the traveling sensor and the result of iterative closest point (ICP) matching of the LiDAR sensor to create the odometry information.

The controller may include a LiDAR service module configured to receive the sensing data of the LiDAR sensor and to determine the amount of location displacement using geometry information based on the sensing data of the LiDAR sensor and previous location information, and a vision service module configured to receive the amount of location displacement from the LiDAR service module, to receive an image from the camera sensor, to determine the location of a feature point through matching between a feature point extracted from the current image based on the amount of location displacement and a feature point extracted from the previous location, and to estimate the current location based on the determined location of the feature point.

The mobile robot may further include a storage configured to store node information including the calculated current location information and a map including the node information.

The vision service module may transmit the node information to the LiDAR service module, and the LiDAR service module may determine the amount of location displacement that the mobile robot has moved while the vision service module calculates the current location in the node information to determine the current location of the mobile robot.

When a traveling sensor configured to sense the traveling state based on movement of the main body is provided, the controller may further include a traveling service module configured to read sensing data of the traveling sensor, the traveling service module may transmit the sensing data of the traveling sensor to the LiDAR service module, and the LiDAR service module may combine odometry information based on the sensing data of the traveling sensor and the ICP result of the LiDAR sensor to create the odometry information.

The controller may calculate the current location based on the sensing data of the LiDAR sensor in an area having an illuminance less than a reference value, and may perform loop closing to correct an error when entering an area having an illuminance equal to or greater than the reference value.

When feature matching between images input from the camera sensor fails, the controller may perform iterative closest point (ICP) matching between a current node and an adjacent node based on the sensing data of the LiDAR sensor to add a correlation between nodes.

In accordance with another aspect of the present disclosure, the above and other objects can be accomplished by the provision of a method of controlling a mobile robot, the method including acquiring geometry information outside a main body through a LiDAR sensor, acquiring an image of the outside of the main body through a camera sensor, creating odometry information based on sensing data of the LiDAR sensor, performing feature matching between images input from the camera sensor base on the odometry information, and estimating the current location based on the result of the feature matching.

The method may further include calculating uncertainty of the estimated current location based on geometry information based on the sensing data of the LiDAR sensor.

The method may further include sensing a traveling state based on movement of the main body through a traveling sensor and matching the sensing data of the LiDAR sensor according to an iterative closest point (ICP) algorithm.

The creating odometry information may include combining sensing data of the traveling sensor and a result of iterative closest point (ICP) matching of the LiDAR sensor to create the odometry information.

The creating odometry information may include a LiDAR service module of a controller receiving the sensing data of the LiDAR sensor and the LiDAR service module discriminating the amount of location displacement using the geometry information and previous location information.

The performing feature matching may include a vision service module of the controller receiving the amount of location displacement from the LiDAR service module, the vision service module receiving an image from the camera sensor, and the vision service module discriminating location of a feature point through matching between a feature point extracted from the current image based on the amount of location displacement and a feature point extracted from the previous location.

Node information including the calculated current location information may be stored in a storage, and may be registered on a map.

The method may further include the vision service module transmitting the node information to the LiDAR service module, the LiDAR service module calculating the amount of location displacement that the mobile robot has moved while the vision service module calculates the current location, and the LiDAR service module including the calculated amount of location displacement in the node information to determine the current location of the mobile robot.

When sensing the traveling state based on movement of the main body through the traveling sensor, the creating odometry information may include the LiDAR service module combining odometry information based on sensing data of the traveling sensor and an ICP result of the LiDAR sensor to create the odometry information.

The traveling service module of the controller may transmit the sensing data of the traveling sensor to the LiDAR service module.

The method may further include calculating the current location based on the sensing data of the LiDAR sensor in an area having an illuminance less than a reference value and performing loop closing to correct an error when the main body moves and enters an area having an illuminance equal to or greater than the reference value.

The method may further include, when feature matching between images input from the camera sensor fails, performing iterative closest point (ICP) matching between a current node and an adjacent node based on the sensing data of the LiDAR sensor to add a correlation between nodes.

BRIEF DESCRIPTION OF THE DRAWINGS

The above and other objects, features and other advantages of the present disclosure will be more clearly understood from the following detailed description taken in conjunction with the accompanying drawings, in which.

DETAILED DESCRIPTION

Reference will now be made in detail to embodiments, examples of which are illustrated in the accompanying drawings. However, the present disclosure may be embodied in many different forms and should not be construed as being limited to the embodiments set forth herein.

Meanwhile, in the following description, with respect to constituent elements used in the following description, the suffixes "module" and "unit" are used or combined with each other only in consideration of ease in preparation of the specification, and do not have or indicate mutually different meanings. Accordingly, the suffixes "module" and "unit" may be used interchangeably.

Also, it will be understood that although the terms "first," "second," etc., may be used herein to describe various components, these components should not be limited by these terms. These terms are only used to distinguish one component from another component.

A mobile robot 100 according to an embodiment of the present disclosure means a robot capable of autonomously moving using wheels or the like, and may be a home helper robot and a robot cleaner. Hereinafter, a robot cleaner having a cleaning function, which is a kind of mobile robot, will be described by way of example with reference to the drawings; however, the present disclosure is not limited thereto.

Figure 1:
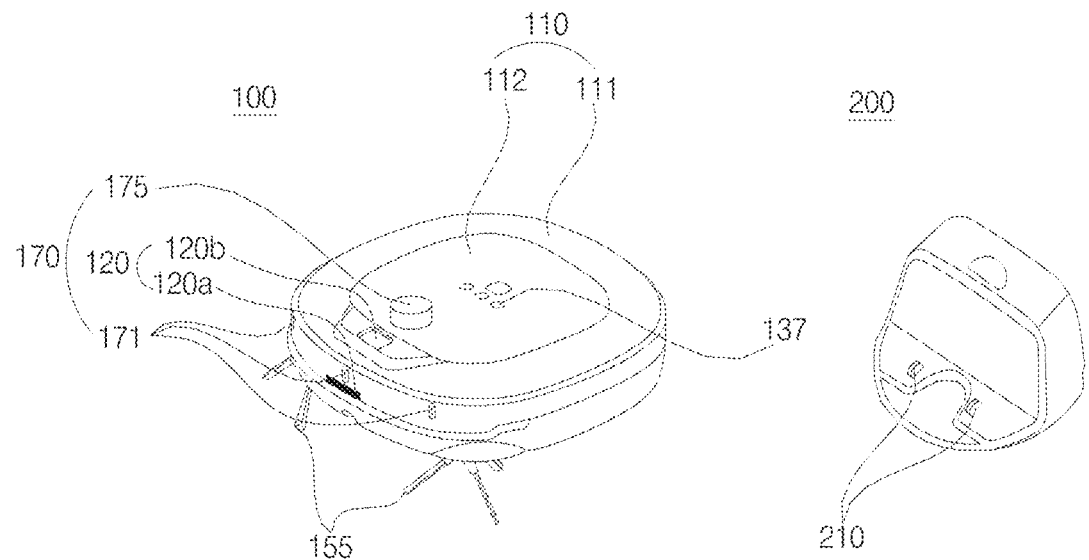
FIG. 1 is a perspective view showing a mobile robot according to an embodiment of the present disclosure and a charging station for charging the mobile robot.

FIG. 1 is a perspective view showing a mobile robot and a charging station for charging the mobile robot according to an embodiment of the present disclosure.

Figure 2:
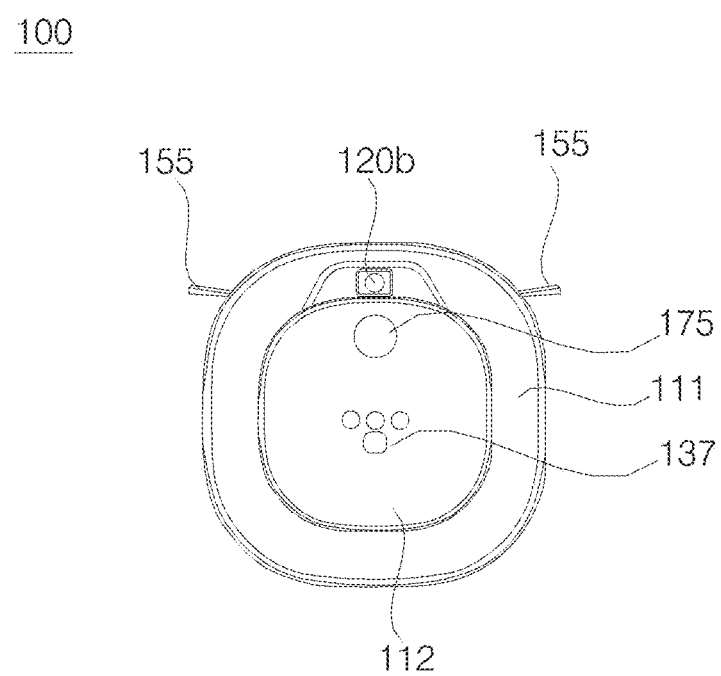
FIG. 2 is a view showing the upper part of the mobile robot shown in FIG. 1.
Figure 3:
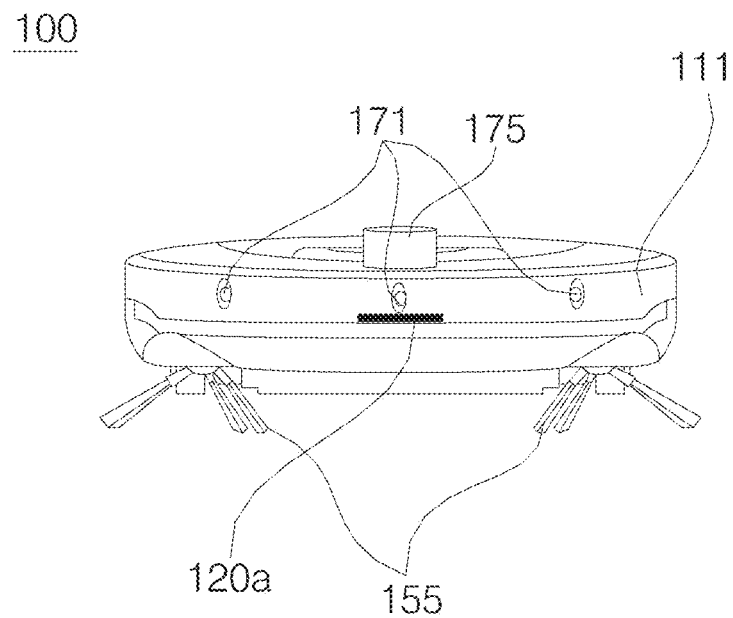
FIG. 3 is a view showing the front part of the mobile robot shown in FIG. 1.
Figure 4:
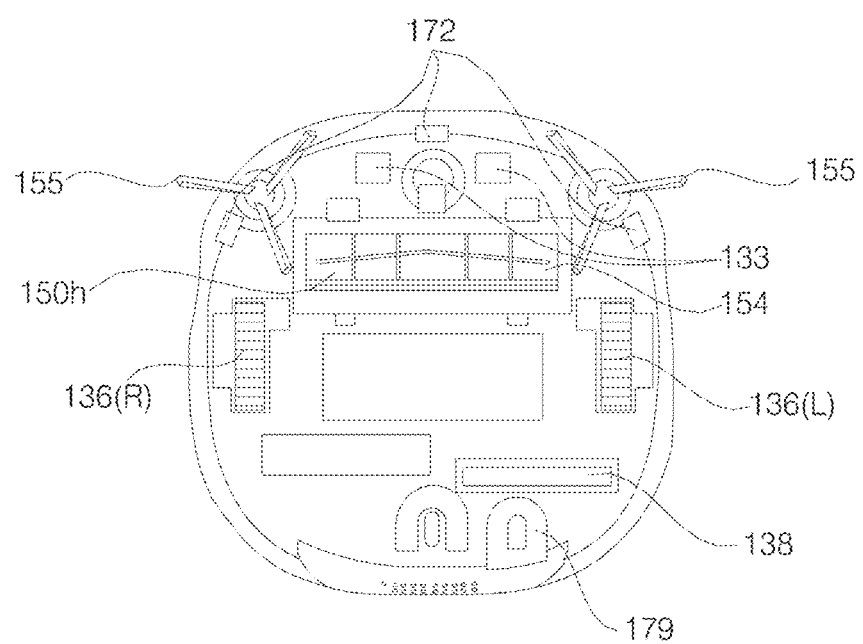
FIG. 4 is a view showing the bottom part of the mobile robot shown in FIG. 1.

FIG. 2 is a view showing the upper part of the mobile robot shown in FIG. 1, FIG. 3 is a view showing the front part of the mobile robot shown in FIG. 1, and FIG. 4 is a view showing the bottom part of the mobile robot shown in FIG. 1.

Figure 5:
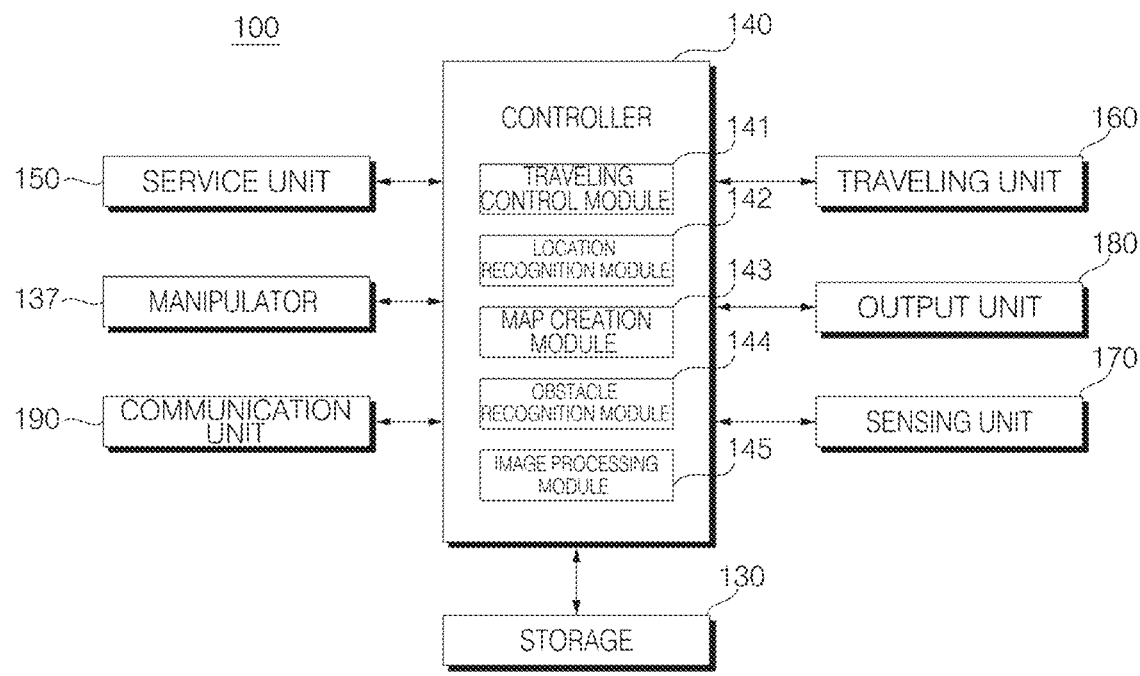
FIG. 5 is a block diagram showing a control relationship between main components of the mobile robot according to the embodiment of the present disclosure.

FIG. 5 is a block diagram showing a control relationship between main components of the mobile robot according to an embodiment of the present disclosure.

Referring to FIGS. 1 to 5, the mobile robot 100 includes a traveling unit 160 for moving a main body 110. The traveling unit 160 includes at least one driving wheel 136 for moving the main body 110. The traveling unit 160 includes a driving motor (not shown) connected to the driving wheel 136 to rotate the driving wheel. For example, the driving wheels 136 may be provided on left and right sides of the main body 110 which, hereinafter, will be referred to as a left wheel 136(L) and a right wheel 136(R).

The left wheel 136(L) and the right wheel 136(R) may be driven by a single driving motor, but, if necessary, may be provided with a left wheel driving motor for driving the left wheel 136(L) and a right wheel driving motor for driving the right wheel 136(R), respectively. The driving direction of the main body 110 may be switched to the left or right side based on a difference in rotational velocity of the left wheel 136(L) and the right wheel 136(R).

The mobile robot 100 includes a service unit 150 for providing a predetermined service. In FIGS. 1 to 5, the present disclosure is described based on an example in which the service unit 150 performs cleaning; however, the present disclosure is not limited thereto. For example, the service unit 150 may be configured to provide a user with a housework service, such as cleaning (for example, sweeping, suction, or mopping), dish washing, cooking, washing, or refuse disposal. As another example, the service unit 150 may perform a security function of sensing trespass, danger, etc.

The mobile robot 100 may clean a floor through the service unit 150 while moving in a traveling zone. The service unit 150 may include a suction device for suctioning foreign matter, brushes 154 and 155 for performing sweeping, a dust container (not shown) for storing the foreign matter collected by the suction device or the brushes, and/or a mopping unit (not shown) for performing mopping.

A suction port 150*h* for suctioning air may be formed in the bottom part of the main body 110. In the main body 110, a suction device (not shown) for supplying suction force for suctioning air through the suction port 150*h* and a dust container (not shown) for collecting dust suctioned through the suction port 150*h* together with the air may be provided.

The main body 110 may include a case 111 defining a space in which various components constituting the mobile robot 100 are accommodated. The case 111 may have an opening for insertion and removal of the dust container, and a dust container cover 112 for opening and closing the opening may be rotatably provided in the case 111.

The main body 110 may be provided with a main brush 154 of a roll type having brushes exposed through the suction port 150*h*, and an auxiliary brush 155 which is located on the front side of the bottom part of the main body 110 and has a brush formed of a plurality of radially extending wings. Due to the rotation of the brushes 154 and 155, dust is separated from a floor in a traveling zone, and the dust separated from the floor is suctioned through the suction port 150h and collected in the dust container.

A battery 138 may supply power not only for the driving motor but also for the overall operation of the mobile robot 100. When the battery 138 is discharged, the mobile robot 100 may travel to return to a charging station 200 for charging. During returning, the mobile robot 100 may automatically detect the location of the charging station 200.

The charging station 200 may include a signal transmitter (not shown) for transmitting a certain return signal. The return signal may be an ultrasound signal or an infrared signal; however, the present disclosure is not limited thereto.

The mobile robot 100 may include a signal sensor (not shown) for receiving the return signal. The charging station 200 may transmit an infrared signal through the signal transmitter, and the signal sensor may include an infrared sensor for sensing the infrared signal. The mobile robot 100 moves to the location of the charging station 200 according to the infrared signal transmitted from the charging station 200 and docks with the charging station 200. Due to docking, charging may be achieved between a charging terminal 133 of the mobile robot 100 and a charging terminal 210 of the charging station 200.

The mobile robot 100 may include a sensing unit 170 for sensing information about the inside/outside of the mobile robot 100.

For example, the sensing unit 170 may include one or more sensors 171 and 175 for sensing various kinds of information about a traveling zone and an image acquisition unit 120 for acquiring image information about the traveling zone. In some embodiments, the image acquisition unit 120 may be provided separately outside the sensing unit 170.

The mobile robot 100 may map the traveling zone based on the information sensed by the sensing unit 170. For example, the mobile robot 100 may perform vision-based location recognition and map creation based on ceiling information of the traveling zone acquired by the image acquisition unit 120. In addition, the mobile robot 100 may perform location recognition and map creation based on a light detection and ranging (LiDAR) sensor 175 using a laser.

More preferably, the mobile robot 100 according to the present disclosure may effectively combine location recognition technology based on vision using a camera and location recognition technology based on LiDAR using a laser to perform location recognition and map creation robust to an environmental change, such as illuminance change or article location change.

Meanwhile, the image acquisition unit 120, which captures an image of the traveling zone, may include one or more camera sensors for acquiring an image of the outside of the main body 110.

In addition, the image acquisition unit 120 may include a camera module. The camera module may include a digital camera. The digital camera may include at least one optical lens, an image sensor (e.g., a CMOS image sensor) including a plurality of photodiodes (e.g., pixels) for forming an image using light passing through the optical lens, and a digital signal processor (DSP) for forming an image based on a signal output from the photodiodes. The digital signal processor can create a moving image including frames composed of still images as well as a still image.

In this embodiment, the image acquisition unit 120 may include a front camera sensor 120a configured to acquire an image of the front of the main body and an upper camera sensor 120b provided at the upper part of the main body 110 to acquire an image of a ceiling in the traveling zone. However, the present disclosure is not limited as to the location and the capture range of the image acquisition unit 120.

For example, the mobile robot 100 may include only the upper camera sensor 120b for acquiring an image of the ceiling in the traveling zone in order to perform vision-based location recognition and traveling.

Alternatively, the image acquisition unit 120 of the mobile robot 100 according to the present disclosure may include a camera sensor (not shown) disposed inclined to one surface of the main body 110 to simultaneously capture front and upper images. That is, it is possible to capture both front and upper images using a single camera sensor. In this case, a controller 140 may divide images captured and acquired by the camera into a front image and an upper image based on field of view. The separated front image may be used for vision-based object recognition, like an image acquired by the front camera sensor 120a. In addition, the separated upper image may be used for vision-based location recognition and traveling, like an image acquired by the upper camera sensor 120b.

The mobile robot 100 according to the present disclosure may perform vision SLAM of comparing a surrounding image with pre-stored image-based information or comparing acquired images with each other to recognize the current location.

Meanwhile, the image acquisition unit 120 may include a plurality of front camera sensors 120a and/or a plurality of upper camera sensors 120b. Alternatively, the image acquisition unit 120 may include a plurality of camera sensors (not shown) configured to simultaneously capture front and upper images.

In this embodiment, a camera may be installed at a portion (for example, the front part, the rear part, or the bottom surface) of the mobile robot to continuously capture images during cleaning. Several cameras may be installed at each portion of the mobile robot to improve capturing efficiency. Images captured by the camera may be used to recognize the kind of a material, such as dust, hair, or a floor, present in a corresponding space, to determine whether cleaning has been performed, or to determine when cleaning has been performed.

The front camera sensor 120a may capture an obstacle present in front of the mobile robot 100 in the traveling direction thereof or the state of an area to be cleaned.

According to the embodiment of the present disclosure, the image acquisition unit 120 may continuously capture a plurality of images of the surroundings of the main body 110, and the acquired images may be stored in a storage 130.

The mobile robot 100 may use a plurality of images in order to improve accuracy in obstacle recognition, or may select one or more from among a plurality of images in order to use effective data, thereby improving accuracy in obstacle recognition.

The sensing unit 170 may include a LiDAR sensor 175 for acquiring information about geometry outside the main body 110 using a laser.

The LiDAR sensor 175 may output a laser, may provide information about the distance, location, direction, and material of an object that has reflected the laser, and may acquire geometry information of a traveling zone. The mobile robot 100 may obtain 360-degree geometry information using the LiDAR sensor 175.

The mobile robot 100 according to the embodiment of the present disclosure may determine the distance, location, and direction of objects sensed by the LiDAR sensor 175 to create a map.

The mobile robot 100 according to the embodiment of the present disclosure may analyze a laser reception pattern, such as time difference or signal intensity of a laser reflected and received from the outside, to acquire geometry information of the traveling zone. In addition, the mobile robot 100 may create a map using the geometry information acquired through the LiDAR sensor 175.

For example, the mobile robot 100 according to the present disclosure may perform LiDAR SLAM of comparing surrounding geometry information acquired at the current location through the LiDAR sensor 175 with pre-stored LiDAR sensor-based geometry information or comparing acquired pieces of geometry information with each other to recognize the current location.

More preferably, the mobile robot 100 according to the present disclosure may effectively combine location recognition technology based on vision using a camera and location recognition technology based on LiDAR using a laser to perform location recognition and map creation robust to environmental change, such as illuminance change or article location change.

SLAM technology of combining vision SLAM and LiDAR SLAM will be described in detail with reference to FIGS. 6 to 20.

Meanwhile, the sensing unit 170 may include sensors 171, 172, and 179 for sensing various data related to the operation and state of the mobile robot.

For example, the sensing unit 170 may include an obstacle sensor 171 for sensing a forward obstacle. In addition, the sensing unit 170 may include a cliff sensor 172 for sensing a cliff on the floor in the traveling zone and a lower camera sensor 179 for acquiring a bottom image.

Referring to FIGS. 1 to 3, the obstacle sensor 171 may include a plurality of sensors installed at the outer circumferential surface of the mobile robot 100 at predetermined intervals.

The obstacle sensor 171 may include an infrared sensor, an ultrasonic sensor, an RF sensor, a geomagnetic sensor, and a position sensitive device (PSD) sensor.

Meanwhile, the location and kind of the sensors included in the obstacle sensor 171 may be changed depending on the type of the mobile robot, and the obstacle sensor 171 may include a wider variety of sensors.

The obstacle sensor 171 is a sensor for sensing the distance to a wall or an obstacle in a room; however, the present disclosure is not limited as to the kind thereof. Hereinafter, an ultrasonic sensor will be described by way of example.

The obstacle sensor 171 senses an object, specifically an obstacle, present in the traveling (moving) direction of the mobile robot, and transmits obstacle information to the controller 140. That is, the obstacle sensor 171 may sense the movement path of the mobile robot, a protrusion present ahead of the mobile robot or beside the mobile robot, or fixtures, furniture, wall surfaces, or wall corners in a house, and may transmit information thereabout to the controller.

At this time, the controller 140 may sense location of the obstacle based on at least two signals received through the ultrasonic sensor, and may control motion of the mobile robot 100 based on the sensed location of the obstacle.

In some embodiments, the obstacle sensor 171, which is provided at the outer surface of the case 111, may include a transmitter and a receiver.

For example, the ultrasonic sensor may include at least one transmitter and at least two receivers, which cross each other. Consequently, it is possible to transmit signals at various angles and to receive the signals reflected by the obstacle at various angles.

In some embodiments, the signal received from the obstacle sensor 171 may pass through a signal processing process, such as amplification and filtering, and then the distance and direction to the obstacle may be calculated.

Meanwhile, the sensing unit 170 may further include a traveling sensor for sensing the traveling state of the mobile robot 100 based on driving of the main body 110 and outputting operation information. A gyro sensor, a wheel sensor, or an acceleration sensor may be used as the traveling sensor. Data sensed by at least one of the traveling sensors or data calculated based on data sensed by at least one of the traveling sensors may constitute odometry information.

The gyro sensor senses the rotational direction of the mobile robot 100 and detects the rotational angle of the mobile robot 100 when the mobile robot 100 moves in an operation mode. The gyro sensor detects the angular velocity of the mobile robot 100, and output a voltage value proportional to the angular velocity. The controller 140 calculates the rotational direction and the rotational angle of the mobile robot 100 using the voltage value output from the gyro sensor.

The wheel sensor is connected to each of the left wheel 136(L) and the right wheel 136(R) to sense the number of rotations of the wheels. Here, the wheel sensor may be an encoder. The encoder senses and outputs the number of rotations of each of the left wheel 136(L) and the right wheel 136(R).

The controller 140 may calculate the rotational velocity of each of the left and right wheels using the number of rotations thereof. In addition, the controller 140 may calculate the rotational angle of each of the left wheel 136(L) and the right wheel 136(R) using the difference in the number of rotations therebetween.

The acceleration sensor senses a change in velocity of the mobile robot, for example, a change of the mobile robot 100 based on departure, stop, direction change, or collision with an object. The acceleration sensor may be attached to a position adjacent to a main wheel or an auxiliary wheel to detect slip or idling of the wheel.

In addition, the acceleration sensor may be mounted in the controller 140 to sense a change in velocity of the mobile robot 100. That is, the acceleration sensor detects an impulse depending on a change in velocity of the mobile robot 100, and outputs a voltage value corresponding thereto. Consequently, the acceleration sensor may perform the function of an electronic bumper.

The controller 140 may calculate a change in location of the mobile robot 100 based on the operation information output from the traveling sensor. The location is a location relative to an absolute location using image information. The mobile robot may improve the performance of location recognition using image information and obstacle information through the relative location recognition.

Meanwhile, the mobile robot 100 may include a power supply (not shown) having a rechargeable battery 138 to supply power to the robot cleaner.

The power supply may supply driving power and operating power to the respective components of the mobile robot 100, and may be charged with charge current from the charging station 200 when the remaining quantity of the battery is insufficient.

The mobile robot 100 may further include a battery sensor (not shown) for sensing the charged state of the battery 138 and transmitting the result of sensing to the controller 140. The battery 138 is connected to the battery sensor, and the remaining quantity and charged state of the battery are transmitted to the controller 140. The remaining quantity of the battery may be displayed on the screen of an output unit (not shown).

In addition, the mobile robot 100 includes a manipulator 137 for allowing an ON/OFF command or various commands to be input. Various control commands necessary for overall operation of the mobile robot 100 may be input through the manipulator 137. In addition, the mobile robot 100 may include an output unit (not shown), and may display schedule information, a battery state, an operation mode, an operation state, or an error state through the output unit.

Referring to FIG. 5, the mobile robot 100 includes a controller 140 for processing and determining various kinds of information, for example, recognizing current location thereof, and a storage 130 for storing various kinds of data. In addition, the mobile robot 100 may further include a communication unit 190 for transmitting and receiving data to and from other devices.

An external terminal, which is one of the devices that communicate with the mobile robot 100, may have an application for controlling the mobile robot 100, may display a map of a traveling zone to be cleaned by the mobile robot 100 through execution of the application, and may designate a specific area to be cleaned on the map. Examples of the external terminal may include a remote controller equipped with an application for map setting, a PDA, a laptop computer, a smartphone, or a tablet computer.

The external terminal may communicate with the mobile robot 100 to display current location of the mobile robot together with the map, and display information about a plurality of areas. In addition, the external terminal displays updated location of the mobile robot depending on traveling thereof.

The controller 140 controls the sensing unit 170, the manipulator 137, and the traveling unit 160, which constitutes the mobile robot 100, thereby controlling overall operation of the mobile robot 100.

The storage 130 stores various kinds of information necessary for controlling the mobile robot 100, and may include a volatile or non-volatile recording medium. The storage medium may store data that can be read by a microprocessor. The present disclosure is not limited as to the kind or implementation scheme thereof.

In addition, the storage 130 may store a map of the traveling zone. The map may be input by an external terminal or a server capable of exchanging information with the mobile robot 100 through wired or wireless communication, or may be created by the mobile robot 100 through self-learning.

Locations of rooms in the traveling zone may be displayed on the map. In addition, current location of the mobile robot 100 may be displayed on the map, and the current location of the mobile robot 100 on the map may be updated during traveling. The external terminal stores a map identical to the map stored in the storage 130.

The storage 130 may store cleaning history information. The cleaning history information may be created whenever cleaning is performed.

The map about the traveling zone stored in the storage 130 may be a navigation map used for traveling during cleaning, a simultaneous localization and mapping (SLAM) map used for location recognition, a learning map using information stored and learned when the mobile robot collides with an obstacle, etc. at the time of cleaning, a global pose map used for global pose recognition, or an obstacle recognition map having information about recognized obstacles recorded therein.

Meanwhile, the maps may not be clearly classified by purpose, although the maps may be partitioned by purpose, stored in the storage 130, and managed, as described above. For example, a plurality of pieces of information may be stored in a single map so as to be used for at least two purposes.

The controller 140 may include a traveling control module 141, a location recognition module 142, a map creation module 143, and an obstacle recognition module 144.

Referring to FIGS. 1 to 5, the traveling control module 141 controls traveling of the mobile robot 100, and controls driving of the traveling unit 160 depending on traveling setting. In addition, the traveling control module 141 may determine the traveling path of the mobile robot 100 based on the operation of the traveling unit 160. For example, the traveling control module 141 may determine the current or past movement velocity, the traveling distance, etc. of the mobile robot 100 based on the rotational velocity of the driving wheel 136, and may also determine the current or past direction change of the mobile robot 100 based on the rotational direction of each of the wheels 136(L) and 136(R). The location of the mobile robot 100 on the map may be updated based on the determined traveling information of the mobile robot 100.

The map creation module 143 may create a map of a traveling zone. The map creation module 143 may process the image acquired through the image acquisition unit 120 to prepare a map. For example, the map creation module may prepare a map corresponding to a traveling zone and a cleaning map corresponding to a cleaning area.

In addition, the map creation module 143 may process an image acquired through the image acquisition unit 120 at each location and may connect the same to the map to recognize a global pose.

In addition, the map creation module 143 may prepare a map based on information acquired through the LiDAR sensor 175, and may recognize the location of the mobile robot based on information acquired through the LiDAR sensor 175 at each location.

More preferably, the map creation module 143 may prepare a map based on information acquired through the image acquisition unit 120 and the LiDAR sensor 175, and may perform location recognition.

The location recognition module 142 estimates and recognizes the current location of the mobile robot. The location recognition module 142 may determine the location of the mobile robot in connection with the map creation module 143 using image information of the image acquisition unit 120, and may thus estimate and recognize the current location of the mobile robot even when the location of the mobile robot 100 is abruptly changed.

The mobile robot 100 may perform location recognition through the location recognition module 142 during continuous traveling, and may learn a map and may estimate the current location thereof through the traveling control module 141, the map creation module 143, and the obstacle recognition module 144 without the location recognition module 142.

During traveling of the mobile robot 100, the image acquisition unit 120 acquires images of the surroundings of the mobile robot 100. Hereinafter, an image acquired by the image acquisition unit 120 will be defined as an "acquisition image."

An acquisition image includes various features, such as lighting located at the ceiling, an edge, a corner, a blob, a ridge, etc.

The map creation module 143 detects features from each acquisition image. Various feature detection methods of extracting feature points from an image are well known in the field of computer vision. Various feature detectors suitable for extracting these feature points are known. For example, there are Canny, Sobel, Harris & Stephens/Plessey, SUSAN, Shi & Tomasi, Level curve curvature, FAST, Laplacian of Gaussian, Difference of Gaussians, Determinant of Hessian, MSER, PCBR, and Gray-level blobs detectors.

The map creation module 143 calculates a descriptor based on each feature point. For feature detection, the map creation module 143 may convert a feature point into a descriptor using a scale invariant feature transform (SIFT) method. The descriptor may be expressed as an n-dimensional vector.

SIFT may detect invariant features with respect to the scale, rotation, and brightness change of an object to be captured, and thus may detect invariant features (i.e. a rotation-invariant feature) even when the same area is captured while the pose of the mobile robot 100 is changed. Of course, the present disclosure is not limited thereto, and various other methods (for example, HOG: Histogram of Oriented Gradients, Haar feature, Fems, LBP: Local Binary Pattern, and MCT: Modified Census Transform) may be applied.

The map creation module 143 may classify at least one descriptor for each acquisition image into a plurality of groups according to a predetermined sub-classification rule based on descriptor information obtained through an acquisition image of each location, and may convert descriptors included in the same group into sub-representation descriptors according to a predetermined sub-representation rule.

As another example, the map creation module may classify all descriptors collected from acquisition images in a predetermined zone, such as a room, into a plurality of groups according to the predetermined sub-classification rule, and may convert descriptors included in the same group into sub-representation descriptors according to the predetermined sub-representation rule.

The map creation module 143 may calculate feature distribution of each location through the above process. The feature distribution of each location may be expressed as a histogram or an n-dimensional vector. As another example, the map creation module 143 may estimate an unknown current location of the mobile robot based on the descriptor calculated from each feature point, not according to the predetermined sub-classification rule and the predetermined sub-representation rule.

Also, when the current location of the mobile robot 100 is unknown due to a location jump, the current location of the mobile robot may be estimated based on data, such as pre-stored descriptors or sub-representation descriptors.

The mobile robot 100 acquires an acquisition image through the image acquisition unit 120 at the unknown current location. Various features, such as lighting located at the ceiling, an edge, a corner, a blob, and a ridge, are identified through the image.

The location recognition module 142 detects features from the acquisition image. Various methods of detecting features from an image in the field of computer vision are well known and various feature detectors suitable for feature detection have been described above.

The location recognition module 142 calculates a recognition descriptor through a recognition descriptor calculation step based on each recognition feature point. In this case, the recognition feature point and the recognition descriptor are provided to describe a process performed by the location recognition module 142, and are provided to be distinguished from terms that describe a process performed by the map creation module 143. That is, the features outside the mobile robot 100 may be defined by different terms.

For feature detection, the location recognition module 142 may convert a recognition feature point into a recognition descriptor using the scale invariant feature transform (SIFT) method. The recognition descriptor may be expressed as an n-dimensional vector.

As described above, SIFT is an image recognition method of selecting a feature point that can be easily identified, such as a corner point, from an acquisition image and calculating an n-dimensional vector having the abrupt degree of change for each direction as a numerical value for each dimension with respect to distribution characteristics of the brightness gradient of pixels belonging to a predetermined zone around each feature point (the direction in which brightness is changed and the abrupt degree of change).

The location recognition module 142 performs conversion into information (sub-recognition feature distribution) comparable with location information that becomes a comparison target (for example, feature distribution of each location) according to a predetermined sub-conversion rule based on information about at least one recognition descriptor obtained through the acquisition image of the unknown current location.

The feature distribution of each location may be compared with the feature distribution of each recognition according to a predetermined sub-comparison rule to calculate similarity therebetween. Similarity (probability) by location corresponding to each location may be calculated, and the location having the greatest calculated probability may be determined to be the current location of the mobile robot.

In this way, the controller 140 may divide a traveling zone to create a map including a plurality of areas, or may recognize the current location of the main body 110 based on a pre-stored map.

In addition, the controller 140 may combine information acquired through the image acquisition unit 120 and the LiDAR sensor 175 to prepare a map, and may perform location recognition.

Upon creating the map, the controller 140 may transmit the created map to the external terminal or the server through the communication unit 190. In addition, upon receiving a map from the external terminal or the server, the controller 140 may store the map in the storage, as described above.

In addition, when the map is updated during traveling, the controller 140 may transmit updated information to the external terminal such that the external terminal and the mobile robot 100 have the same map. As the external terminal and the mobile robot 100 have the same map, the mobile robot 100 may clean a designated area according to a cleaning command from the external terminal, and the current location of the mobile robot may be displayed on the external terminal.

In this case, the cleaning area on the map may be divided into a plurality of areas, and the map may include a connection path for interconnecting the areas and information about obstacles in the areas.

When a cleaning command is input, the controller 140 determines whether the location on the map and the current location of the mobile robot coincide with each other. The cleaning command may be input from the remote controller, the manipulator, or the external terminal.

When the current location does not coincide with the location on the map or when the current location cannot be confirmed, the controller 140 may recognize the current location to restore the current location of the mobile robot 100, and may control the traveling unit 160 to move to a designated area based on the current location.

When the current location does not coincide with the location on the map or when the current location cannot be confirmed, the location recognition module 142 may analyze the acquisition image input from the image acquisition unit 120 and/or the geometry information acquired through the LiDAR sensor 175 to estimate the current location based on the map. In addition, the obstacle recognition module 144 and the map creation module 143 may also recognize the current location in the same manner.

After restoring the current location of the mobile robot 100 through location recognition, the traveling control module 141 calculates a traveling path from the current location to the designated area, and controls the traveling unit 160 to move to the designated area.

Upon receiving cleaning pattern information from the server, the traveling control module 141 may divide the entire traveling zone into a plurality of areas according to the received cleaning pattern information, and may set at least one area to a designated area.

In addition, the traveling control module 141 may calculate a traveling path according to the received cleaning pattern information, and may perform cleaning while traveling along the traveling path.

When cleaning of the designated area is completed, the controller 140 may store a cleaning record in the storage 130.

In addition, the controller 140 may periodically transmit the operation state or the cleaning state of the mobile robot 100 to the external terminal or the server through the communication unit 190.

Accordingly, the external terminal displays the location of the mobile robot with the map on the screen of an application that is being executed based on received data, and outputs information about the cleaning state.

The mobile robot 100 according to the embodiment of the present disclosure moves in one direction until an obstacle or a wall is sensed, and when the obstacle recognition module 144 recognizes the obstacle, the mobile robot may decide a traveling pattern, such as straight movement or turning, based on the attributes of the recognized obstacle.

For example, when the recognized obstacle is an obstacle over which the mobile robot can pass, the mobile robot 100 may continuously move straight. When the recognized obstacle is an obstacle over which the mobile robot cannot pass, the mobile robot 100 may turn, move a predetermined distance, and move to a distance from which the obstacle can be sensed in the direction opposite to the initial movement direction, i.e. may travel in a zigzag fashion.

The mobile robot 100 according to the embodiment of the present disclosure may perform human and object recognition and evasion based on machine learning.

The controller 140 may include an obstacle recognition module 144 for recognizing an obstacle pre-learned based on machine learning in an input image and a traveling control module 141 for controlling driving of the traveling unit 160 based on the attributes of the recognized obstacle.

The mobile robot 100 according to the embodiment of the present disclosure may include an obstacle recognition module 144 that has learned the attributes of an obstacle based on machine learning.

Machine learning means that computers learn through data without humans directly instructing logic to the computers and solve a problem based on learning.

Deep learning is artificial intelligence technology in which computers can learn for themselves, like humans, based on an artificial neural network (ANN) for constituting artificial intelligence without the humans teaching the computers using a method of teaching humans' way of thinking.

The artificial neural network (ANN) may be realized in the form of software or the form of hardware, such as a chip.

The obstacle recognition module 144 may include a software- or hardware-type artificial neural network (ANN) that has learned the attributes of an obstacle.

For example, the obstacle recognition module 144 may include a deep neural network (DNN) that has been trained based on deep learning, such as a convolutional neural network (CNN), a recurrent neural network (RNN), or a deep belief network (DBN).

The obstacle recognition module 144 may determine the attributes of an obstacle included in input image data based on weights between nodes included in the deep neural network (DNN).

The controller 140 may determine the attributes of an obstacle present in a moving direction using only a portion of an image acquired by the image acquisition unit 120, especially the front camera sensor 120a, not using the entirety of the image.

In addition, the traveling control module 141 may control driving of the traveling unit 160 based on the attributes of the recognized obstacle.

Meanwhile, the storage 130 may store input data for discriminating the attributes of an obstacle and data for training the deep neural network (DNN).

The storage 130 may store the original image acquired by the image acquisition unit 120 and extracted images of predetermined areas.

In addition, in some embodiments, the storage 130 may store weights and biases constituting the structure of the deep neural network (DNN).

Alternatively, in some embodiments, the weights and biases constituting the structure of the deep neural network (DNN) may be stored in an embedded memory of the obstacle recognition module 144.

Meanwhile, whenever a portion of the image acquired by the image acquisition unit 120 is extracted, the obstacle recognition module 144 may perform a learning process using the extracted image as training data, or after a predetermined number or more of extracted images are acquired, the obstacle recognition module may perform the learning process.

That is, whenever an obstacle is recognized, the obstacle recognition module 144 may add the result of recognition to update the structure of the deep neural network (DNN), such as weights, or after a predetermined number of training data are secured, the obstacle recognition module may perform the learning process using the secured training data to update the structure of the deep neural network (DNN), such as weights.

Alternatively, the mobile robot 100 may transmit the original image acquired by the image acquisition unit 120 or extracted images to a predetermined server through the communication unit 190, and may receive data related to machine learning from the predetermined server.

In this case, the mobile robot 100 may update the obstacle recognition module 144 based on the data related to machine learning received from the predetermined server.

Meanwhile, the mobile robot 100 may further include an output unit 180 for visibly displaying or audibly outputting predetermined information.

The output unit 180 may include a display (not shown) for visibly displaying information corresponding to user command input, the result of processing corresponding to the user command input, an operation mode, an operation state, an error state, etc.

In some embodiments, the display may be connected to a touchpad in a layered structure so as to constitute a touchscreen. In this case, the display constituting the touchscreen may also be used as an input device for allowing a user to input information by touch, in addition to an output device.

In addition, the output unit 180 may further include a sound output unit (not shown) for outputting an audio signal. The sound output unit may output an alarm sound, a notification message about an operation mode, an operation state, and an error state, information corresponding to user command input, and the processing result corresponding to the user command input in the form of sound under control of the controller 140. The sound output unit may convert an electrical signal from the controller 140 into an audio signal, and may output the audio signal. To this end, a speaker may be provided.

Figure 6:
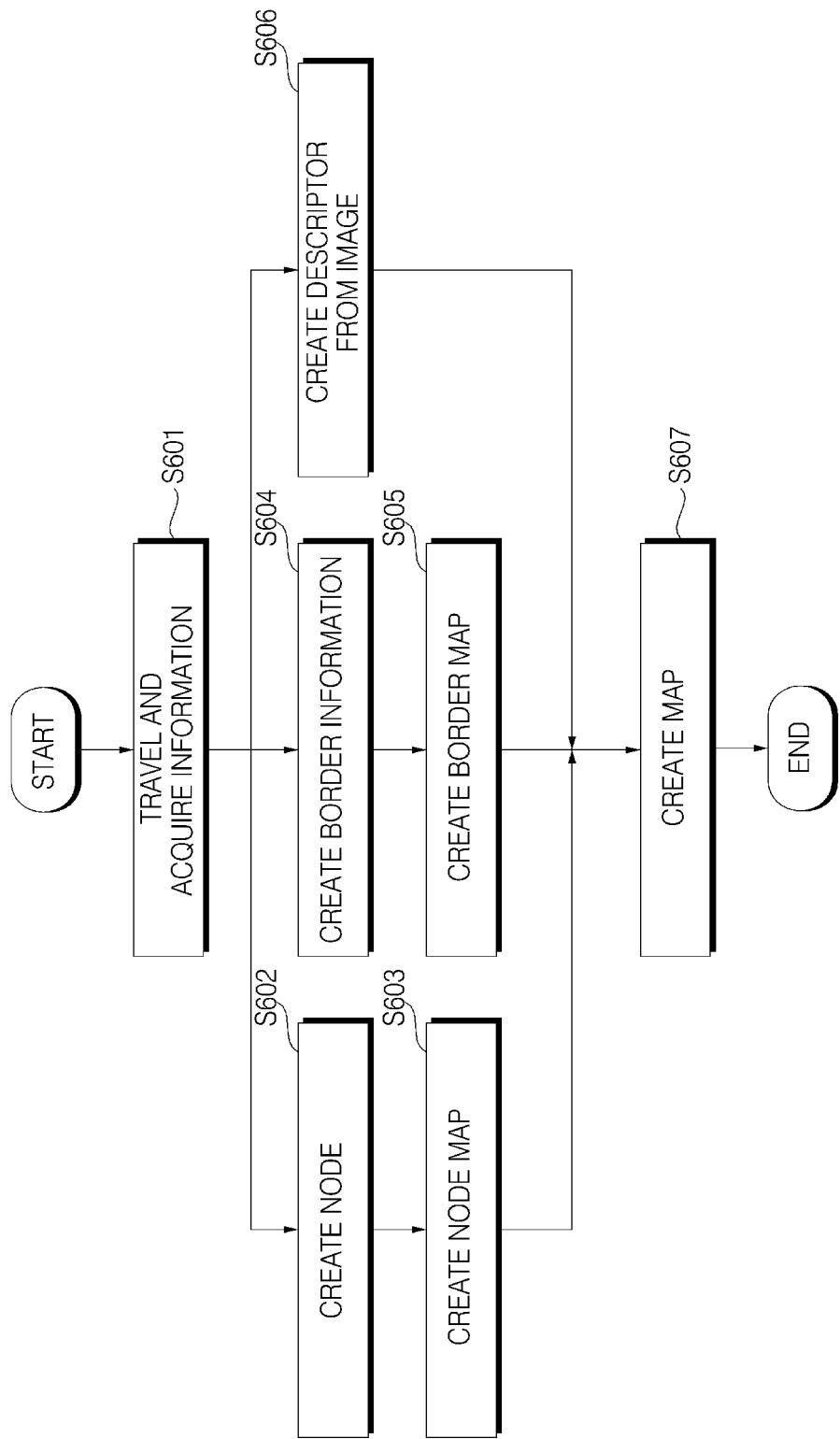
FIG. 6 is a flowchart showing a method of controlling a mobile robot according to an embodiment of the present disclosure.

FIG. 6 is a flowchart showing a method of controlling a mobile robot according to an embodiment of the present disclosure, which is a flowchart showing a map creation process, and FIGS. 7 to 10 are reference views illustrating the control method of FIG. 6.

Figure 7:
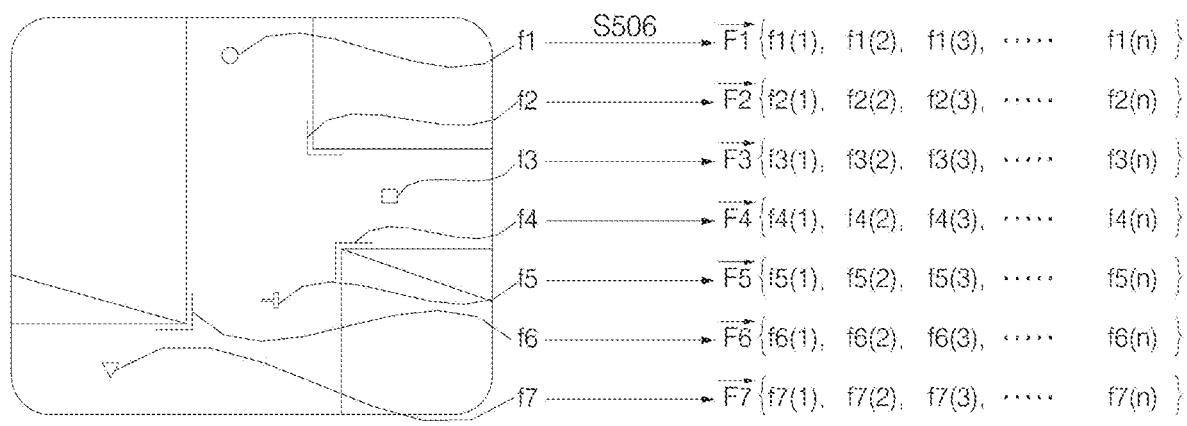
FIGS. 7 to 10 are reference views illustrating the control method of FIG. 6.
Figure 8:
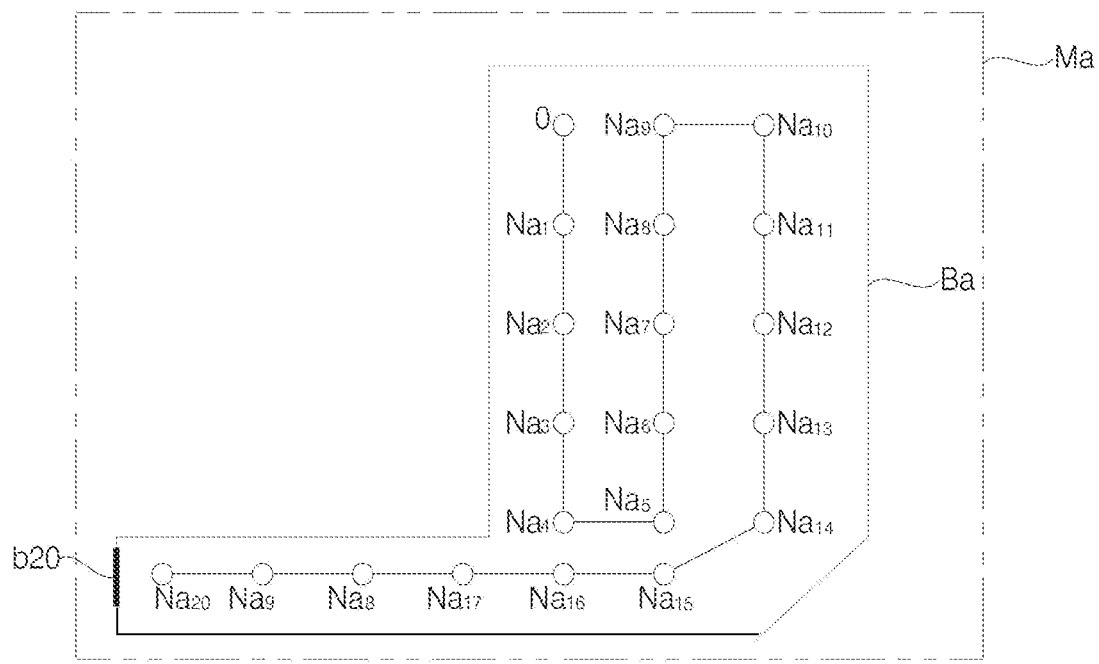

FIGS. 7 and 8 are conceptual views illustrating a traveling and information acquisition process (S601), a node creation process (S602), a node map creation process (S603), a border creation process (S604), a border map creation process (S605), and a descriptor creation process (S606) of FIG. 6.

FIG. 7 shows an image acquired in process S601 and a plurality of feature points f1, f2, f3, f4, f5, f6, and f7 in the image, and shows a diagram of creating descriptors $\vec{F1}, \vec{F2}, \vec{F3}, \ldots, \vec{F7}$, which are n-dimensional vectors corresponding to the feature points f1, f2, f3, ..., f7 respectively, in process S606.

Referring to FIGS. 7 and 8, in the information acquisition process (S601), the image acquisition unit 120 acquires an image at each point during traveling of the mobile robot 100. For example, the image acquisition unit 120 may perform capturing toward the upper side of the mobile robot 100 to acquire an image of a ceiling, etc.

Also, in the information acquisition process (S601), a traveling obstacle factor may be sensed using the sensing unit 170, the image acquisition unit 120, or other well-known means during traveling of the mobile robot 100.

The mobile robot 100 may sense a traveling obstacle factor at each point. For example, the mobile robot may sense the outer surface of a wall, which is one of the traveling obstacle factors, at a specific point.

Referring to FIGS. 7 and 8, in the node generation process (S602), the mobile robot 100 creates a node corresponding to each point. Coordinate information corresponding to a node Na18, Na19, or Na20 may be created based on the traveling displacement measured by the mobile robot 100.

A node may mean data indicating any one location on a map corresponding to a predetermined point in a traveling zone, and, in graph-based SLAM, a node may mean the pose of a robot. In addition, the pose may include location coordinate information (X, Y) and direction information θ in a coordinate system.

Node information may mean various data corresponding to the node. A map may include a plurality of nodes and node information corresponding thereto.

Traveling displacement is a concept including the moving direction and the moving distance of the mobile robot. Assuming that the floor surface in the traveling zone is in a plane in which X and Y axes are orthogonal, the traveling displacement may be expressed as (Δx,Δy,θ). Δx,Δy may represent displacement in X-axis and Y-axis directions, and θ may represent a rotational angle.

The controller 140 may measure the traveling displacement of the mobile robot 100 based on the operation of the traveling unit 160. For example, the traveling control module 141 may measure the current or past movement velocity, the traveling distance, etc. of the mobile robot 100 based on the rotational speed of the driving wheel 136, and may also measure the current or past direction change process based on the rotational direction of the driving wheel 136.

In addition, the controller 140 may measure the traveling displacement using data sensed by the sensing unit 170. For example, the traveling displacement may be measured using a wheel sensor connected to each of the left wheel 136(L) and the right wheel 136(R) to sense the number of rotations of the wheels, such as an encoder.

The controller 140 may calculate the rotational velocity of each of the left and right wheels using the number of rotations thereof. In addition, the controller 140 may calculate the rotational angle of each of the left wheel 136(L) and the right wheel 136(R) using the difference in the number of rotations therebetween.

In general, an encoder has a limitation in that errors are accumulated as integration is continuously performed. More preferably, therefore, the controller 140 may create odometry information, such as traveling displacement, based on sensing data of the LiDAR sensor 175.

The controller 140 may combine sensing data sensed by the wheel sensor and sensing data of the LiDAR sensor 175 to create more accurate odometry information. For example, the controller may combine sensing data of the traveling sensor and the result of iterative closest point (ICP) matching of the LiDAR sensor 175 to create odometry information.

Consequently, it is possible to prevent the occurrence of an error due to idling or slip of the wheels caused when odometry information is created simply depending on the rotation of the wheels, or due to collision, constraint, or kidnapping of the mobile robot and to minimize accumulated errors, whereby it is possible to create more accurate odometry information.

Referring to FIGS. 7 and 8, in the border creation process (S604), the mobile robot 100 creates border information b20 corresponding to a traveling obstacle factor. In the border information creation process (S604), the mobile robot 100 may create border information corresponding to each traveling obstacle factor. A plurality of traveling obstacle factors may achieve one-to-one correspondence to a plurality of pieces of border information. The border information b20 may be created based on coordinate information of a corresponding node and a distance value measured by the sensing unit 170.

Referring to FIGS. 7 and 8, the node map creation process (S603) and the border map creation process (S605) are performed simultaneously. In the node map creation process (S603), a node map including a plurality of nodes Na18, Na19, Na20, and the like is created. In the border map creation process (S605), a border map Ba including a plurality of pieces of border information b20 and the like is created. A map Ma including the node map and the border map Ba is created in the node map creation process (S603) and the border map creation process (S605). FIG. 6 shows a map Ma being created through the node map creation process (S603) and the border map creation process (S605).

In the image shown in FIG. 7, various feature points, such as lighting located in the ceiling, an edge, a corner, a blob, and a ridge, are identified. The mobile robot 100 extracts feature points from an image. Various feature detection methods of extracting feature points from an image are well known in the field of computer vision. Various feature detectors suitable for extracting these feature points are known. For example, there are Canny, Sobel, Harris & Stephens/Plessey, SUSAN, Shi & Tomasi, Level curve curvature, FAST, Laplacian of Gaussian, Difference of Gaussians, Determinant of Hessian, MSER, PCBR, and Gray-level blobs detector.

Referring to FIG. 7, in the descriptor creation process (S606), descriptors $\vec{F1}, \vec{F2}, \vec{F3}, \ldots, \vec{F7}$ are created based on a plurality of feature points f1, f2, f3, ..., f7 extracted from the acquired image. In the descriptor creation process (S606), descriptors $\vec{F1}, \vec{F2}, \vec{F3}, \ldots, \vec{Fm}$ are created based on a plurality of feature points f1, f2, f3, ..., fm extracted from a plurality of acquired images (where m is a natural number). A plurality of feature points f1, f2, f3, ..., fm achieves one-to-one correspondence to a plurality of descriptors $\vec{F1}, \vec{F2}, \vec{F3}, \ldots, \vec{Fm}$.

$\vec{F1}, \vec{F2}, \vec{F3}, \ldots, \vec{Fm}$ mean n-dimensional vectors. f1(1), f1(2), f1(3), ..., f1(n) in curly brackets { } of $\vec{F1}$ mean the numerical values of each dimension forming $\vec{F1}$. Since the notation for the rest $\vec{F2}, \vec{F3}, \ldots, \vec{F7}$ has the same method, a description thereof will be omitted.

A plurality of descriptors $\vec{F1}, \vec{F2}, \vec{F3}, \ldots, \vec{Fm}$ corresponding to a plurality of feature points f1, f2, f3, ..., fm may be created, by using scale invariant feature transform (SIFT) technology for feature detection.

For example, after choosing the feature points f1, f2, f3, f4, f5, f6, and f7, which are easy to identify in the image, by applying the SIFT technology, it is possible to create a descriptor that is an n-dimensional vector based on the distribution characteristics (the direction in which brightness is changed and the abrupt degree of change) of a brightness gradient of pixels belonging to a certain area around each feature point f1, f2, f3, f4, f5, f6, or f7. Here, the direction of each brightness change of the feature point may be regarded as each dimension, and it is possible to create an n-dimensional vector (descriptor) in which the abrupt degree of change in the direction of each brightness change is a numerical value for each dimension. SIFT may detect invariant features with respect to the scale, rotation, and brightness change of an object to be captured, and thus may detect invariant features (i.e. a rotation-invariant feature) even when the same area is captured while the pose of the mobile robot 100 is changed. Of course, the present disclosure is not limited thereto, and various other methods (for example, HOG: Histogram of Oriented Gradients, Haar feature, Fems, LBP: Local Binary Pattern, and MCT: Modified Census Transform) may be applied.

Figure 9:
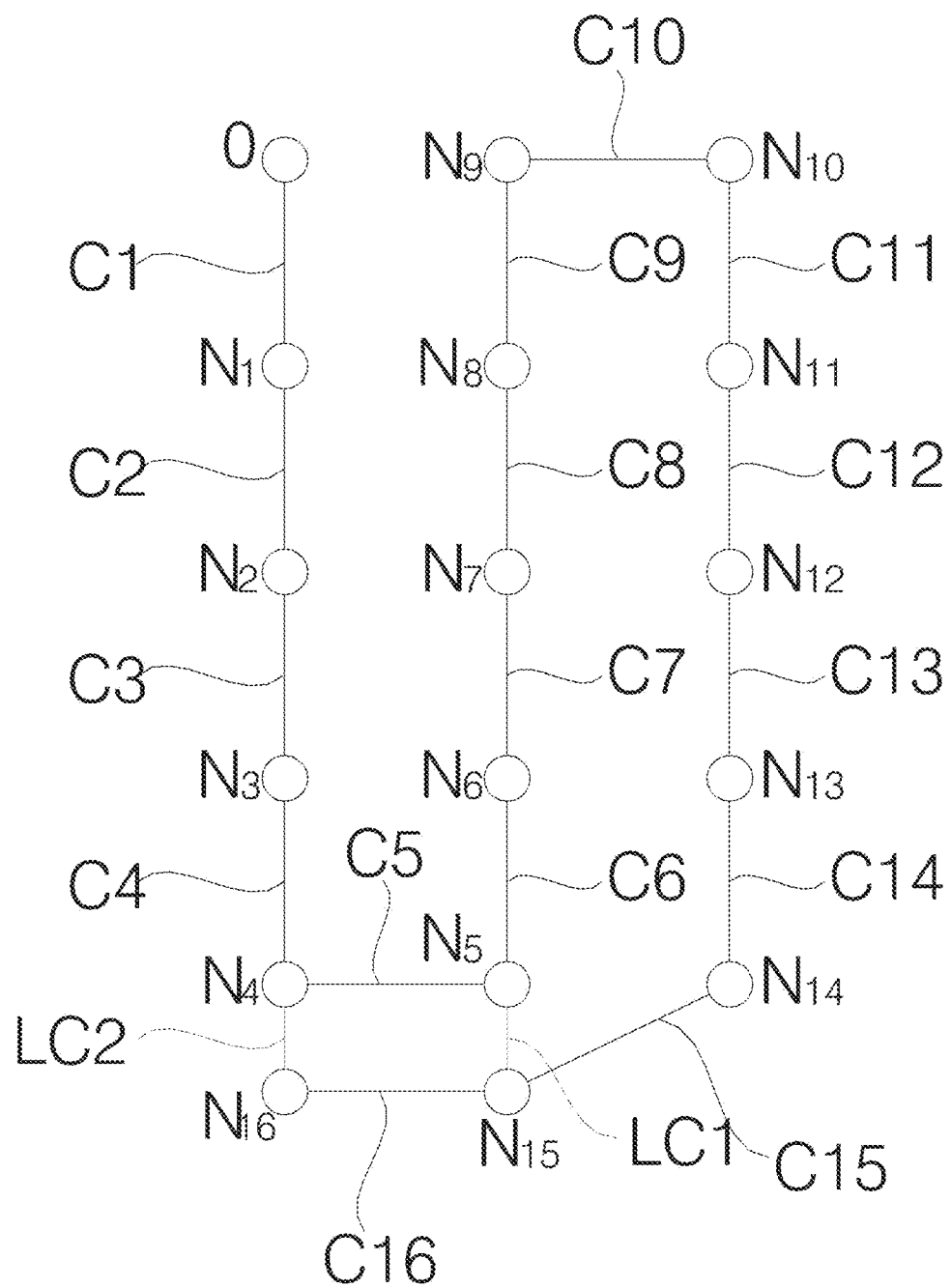

FIG. 9 is a conceptual view showing a plurality of nodes N created by the mobile robot during movement and displacement C between the nodes.

Referring to FIG. 9, traveling displacement C1 is measured while the origin node O is set, and information of a node N1 is created. Traveling displacement C2 that is measured afterwards may be added to coordinate information of the node N1 which is the starting point of the traveling displacement C2 in order to create coordinate information of a node N2 which is the end point of the traveling displacement C2. Traveling displacement C3 is measured in the state in which the information of the node N2 is created, and information of a node N3 is created. Information of nodes N1, N2, N3, ..., N16 is sequentially created based on traveling displacements C1, C2, C3, ..., C16 that are sequentially measured as described above.

When defining a node C15 which is the starting point of any one traveling displacement C15 as 'base node' of the node 16 which is the end point of a corresponding traveling displacement C15, loop displacement (Loop Constraint: LC) means a measured value of displacement between any one node N15 and another adjacent node N5 which is not the 'base node N14' of the node N15.

As an example, acquisition image information corresponding to any one node N15 and acquisition image information corresponding to the other adjacent node N5 may be compared with each other such that the loop displacement (LC) between two nodes N15 and N5 can be measured. As another example, the distance information between any one node N15 and the surrounding environment thereof may be compared with the distance information between the other adjacent node N5 and the surrounding environment thereof such that the loop displacement (LC) between the two nodes N15 and N5 can be measured. FIG. 8 illustrates loop displacement LC1 measured between the node N5 and the node N15, and loop displacement LC2 measured between the node N4 and the node N16.

Information of any one node N5 created based on the traveling displacement may include node coordinate information and image information corresponding to the node. When the node N15 is adjacent to the node N5, image information corresponding to the node N15 may be compared with the image information corresponding to the node N5 to measure the loop displacement LC1 between the two nodes N5 and N15. When the 'loop displacement LC1' and the 'displacement calculated according to the previously stored coordinate information of the two nodes N5 and N15' are different from each other, it is possible to update the coordinate information of the two nodes N5 and N15 by considering that there is an error in the node coordinate information. In this case, coordinate information of the other nodes N6, N7, N8, N9, N10, N1, N12, N13, and N14 connected to the two nodes N5 and N15 may also be updated. In addition, the node coordinate information, which is updated once, may be continuously updated through the above process.

This will be described in more detail as follows. It is assumed that two nodes (N) having measured loop displacement LC therebetween are a first loop node and a second loop node, respectively. A difference ($\Delta x1-\Delta x2, \Delta y1-\Delta y2, \theta_1-\theta 2$) between the 'calculated displacement ($\Delta x1, \Delta y1, \theta 1$)' (calculated by a difference between coordinate values) calculated by the previously stored node coordinate information of the first loop node and the previously stored node coordinate information of the second loop node and the loop displacement LC ($\Delta x2, \Delta y2, \theta 2$) may occur. When the difference occurs, the node coordinate information may be updated by considering the difference as an error. The node coordinate information is updated on the assumption that the loop displacement LC is more accurate than the calculated displacement.

In the case of updating the node coordinate information, only the node coordinate information of the first loop node and the second loop node may be updated. However, since the error occurs by accumulating the errors of the traveling displacements, it is possible to disperse the error and to set the node coordinate information of other nodes to be updated. For example, the node coordinate information may be updated by distributing the error values to all the nodes created by the traveling displacement between the first loop node and the second loop node. Referring to FIG. 8, when the loop displacement LC1 is measured and the error is calculated, the error may be dispersed to the nodes N6 to N14 between the first loop node N15 and the second loop node N5 such that all the node coordinate information of the nodes N5 to N15 may be updated little by little. Of course, it is also possible to update the node coordinate information of the other nodes N1 to N4 by expanding the error dispersion.

Figure 10:
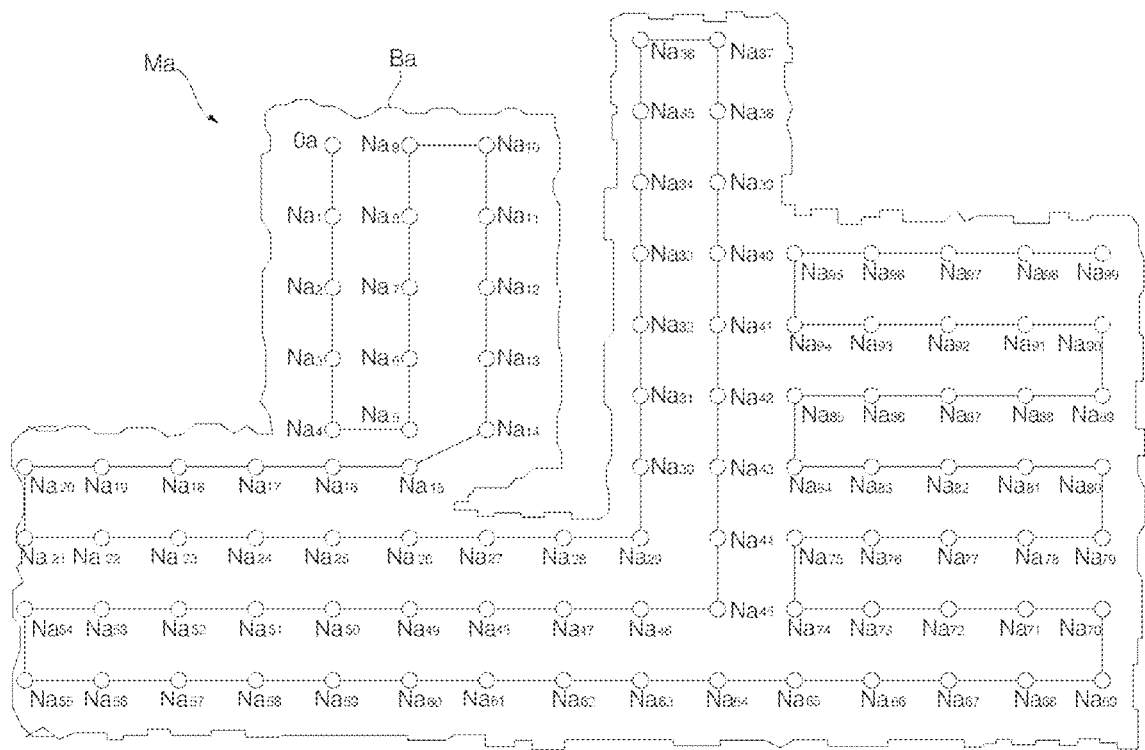

FIG. 10 is a conceptual view showing an example of the first map Ma, and is a view including a created node map. FIG. 10 shows an example of any one map Ma created through the map creation step of FIG. 6. The map Ma may include a node map and a border map Ba. The node map may include a plurality of first nodes Na1 to Na99.

Referring to FIG. 10, any one map Ma may include node maps Na1, Na2, . . . , Na99 and a border map Ba. A node map refers to information consisting of a plurality of nodes among various kinds of information in a single map, and a border map refers to information consisting of a plurality of pieces of border information among various kinds of information in a single map. The node map and the border map are elements of the map, and the processes of creating the node map (S602 and S603) and the processes of creating the border map (S604 and S605) are performed simultaneously. For example, border information may be created based on the pre-stored coordinate information of a node corresponding to a specific point, after measuring the distance between the traveling obstacle factor and the specific point. For example, the node coordinate information of the node may be created based on the pre-stored border information corresponding to a specific obstacle factor, after measuring the distance of the specific point away from the specific obstacle. As for the node and border information, one may be created on the map based on the relative coordinates of one with respect to the other stored previously.

In addition, the map may include image information created in process S606. A plurality of nodes achieves one-to-one correspondence to a plurality of image information. Specific image information corresponds to a specific node.

Figure 11:
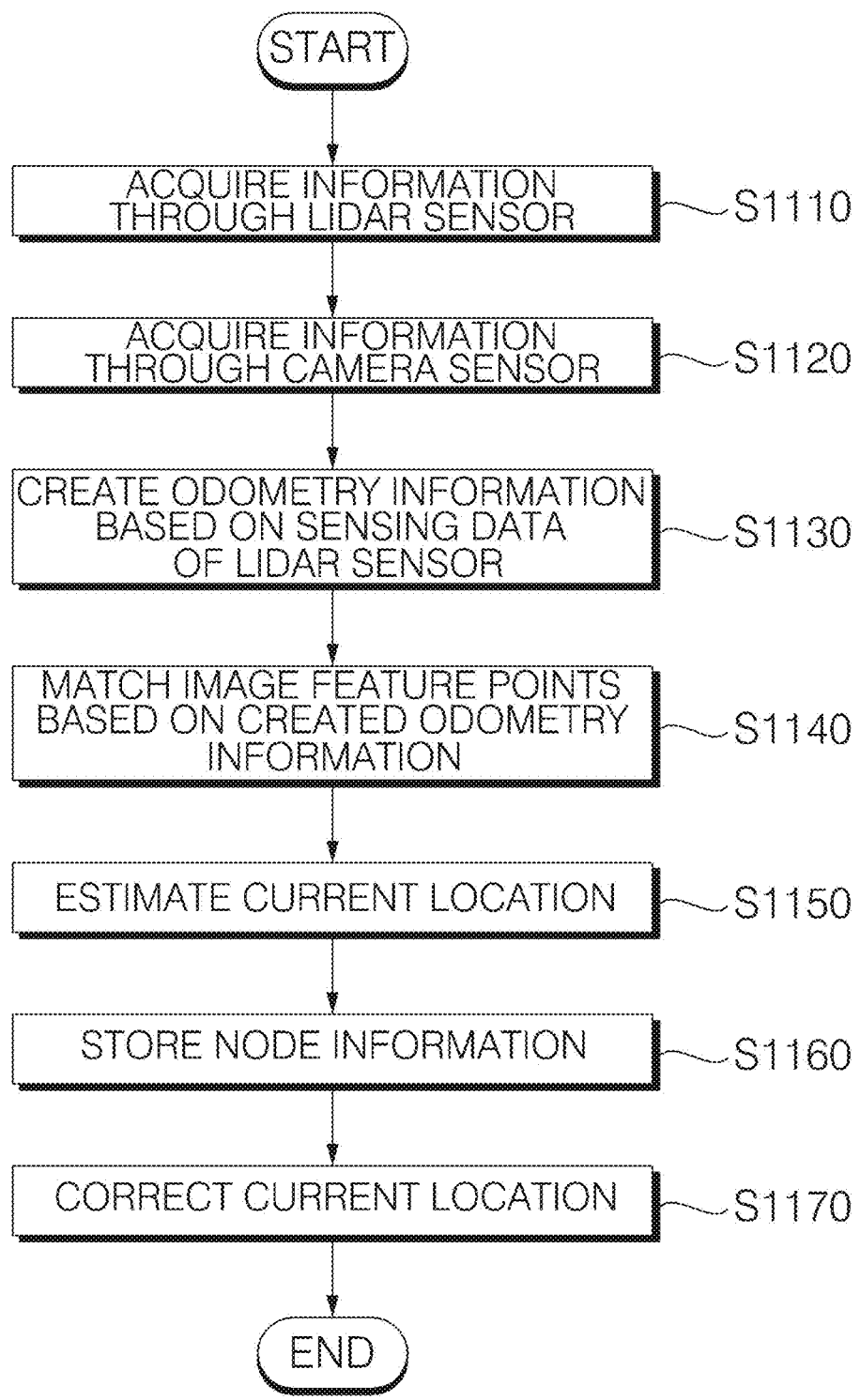
FIG. 11 is a flowchart showing a method of controlling a mobile robot according to another embodiment of the present disclosure.

FIG. 11 is a flowchart showing a method of controlling a mobile robot according to another embodiment of the present disclosure.

The mobile robot 100 according to the embodiment of the present disclosure may include the LiDAR sensor 175 for acquiring geometry information of the outside of the main body 110 and the camera sensor 120b for acquiring an image of the outside of the main body 110.

The mobile robot 100 may acquire geometry information of a traveling zone through the LiDAR sensor 175 during operation thereof (S1110).

In addition, the mobile robot 100 may acquire image information of the traveling zone through the image acquisition unit 120, such as the camera sensor 120b, during operation thereof (S1120).

Meanwhile, the controller 140 may create odometry information based on sensing data of the LiDAR sensor 175 (S1130).

For example, the controller 140 may compare surrounding geometry information based on sensing data sensed at a specific location through the LiDAR sensor 175 with pre-stored geometry information based on the LiDAR sensor to create odometry information, such as traveling displacement.

More preferably, the controller 140 may combine sensing data of the traveling sensor, such as the wheel sensor, which senses the traveling state based on the movement of the main body 110 and sensing data of the LiDAR sensor 175 to create more accurate odometry information.

An encoder connected to each of the left wheel 136(L) and the right wheel 136(R) to sense and output the number of rotations of the wheels may be used as the wheel sensor. In general, the encoder has a limitation in that errors are accumulated as integration is continuously performed.

The controller may combine sensing data of the traveling sensor and the result of the iterative closest point (ICP) matching of the LiDAR sensor to create odometry information.

Consequently, it is possible to create more accurate odometry information than the case in which odometry information is created depending on the wheel sensor alone, and to accurately calculate traveling displacement, whereby it is possible to improve accuracy in location recognition.

According to the embodiment of the present disclosure, sensing data of the LiDAR sensor 175 may be matched according to an iterative closest point (ICP) algorithm, and, in the step of creating the odometry information (S1130), the control 140 may combine sensing data of the traveling sensor and the result of iterative closest point (ICP) matching of the LiDAR sensor 175 to create the odometry information.

The controller 140 may detect two points having the closest distance between pieces of information acquired through the LiDAR sensor 175 at different point in time. The controller may set the two detected points to corresponding points.

The controller 140 may detect odometry information related to traveling displacement of the mobile robot 100 using momentum that makes locations of the set corresponding points equal to each other.

The controller 140 may detect location information related to the current point of the mobile robot 100 using location information related to the point at which movement starts (the previous location) and the detected traveling displacement.

According to the embodiment of the present disclosure, it is possible to create odometry information and to estimate the location of the mobile robot 100 using an iterative closest point (ICP) algorithm, which is widely utilized as an algorithm for matching related data.

For example, matching to a location at which the distance between points is the closest between data acquired by the LiDAR sensor 175 and pre-stored data may be achieved as the result of matching of data according to the ICP algorithm. Consequently, the location of the mobile robot 100 may be estimated. In addition, odometry information may be created based on the previous location.

Alternatively, odometry information based on sensing data of the LiDAR sensor 175 may be created using another algorithm.

Meanwhile, the controller 140 may perform matching of feature points between images input from the camera sensor 120b based on the odometry information (S1140), and may estimate the current location base on the result of matching of the feature points (S1150).

The controller 140 detects various features, such as lighting located at the ceiling, an edge, a corner, a blob, and a ridge, from the image input from the camera sensor 120b.

As described with reference to FIGS. 5 to 10, the controller 140 calculates a recognition descriptor through the recognition descriptor calculation step based on each recognition feature point, and performs conversion into information (sub-recognition feature distribution) comparable with location information that becomes a comparison target (for example, feature distribution of each location) according to the predetermined sub-conversion rule based on information about at least one recognition descriptor.

The controller 140 may match feature points between images input from the camera sensor 120b, or may match feature points extracted from an image input from the camera sensor 120b with feature points of image information registered on the map.

The feature distribution of each location may be compared with the feature distribution of each recognition according to the predetermined sub-comparison rule to calculate similarity therebetween. Similarity (probability) by location corresponding to each location may be calculated, and the location having the greatest calculated probability may be determined to be the current location of the mobile robot.

In addition, the controller 140 may register a node corresponding to the determined current location on the map (S1160).

Since registration of a node unnecessary in terms of resource management on the map creation and update process is wasteful, whether to register the node may be determined according to a predetermined criterion.

For example, the controller 140 may check a node within a predetermined reference distance based on a node corresponding to the current location on a node map to determine whether to register the node. Here, the node map may be a map including a plurality of nodes indicating the location of the robot calculated using sensing information, and may be a SLAM map.

The controller 140 may be configured to register a node only when additional meaningful information on the map is necessary.

The controller 140 may determine whether an edge (constraint) is present between all nodes within a predetermined distance based on the current location and the current node. This may be determination as to whether feature points of the current node and an adjacent node are matched with each other. For example, when a corner point is present as the feature point, the corner point may be compared with the previous corner point, and whether relative coordinates of the robot are present may be determined, whereby it is possible to determine whether correlation is present.

Meanwhile, in graph-based SLAM, an edge joining nodes may be traveling displacement information between locations of the robot, odometry information, or constraint.

To create and add a correlation between nodes is to create an edge joining nodes. As an example, creation of a correlation between nodes may mean calculation of a relative location between two nodes and an error value of the relative location.

That is, an edge (constraint) is relative coordinates between a node and the robot, and may indicate a relationship between nodes. In addition, that an edge (constraint) is present may mean that partially overlapping sensing information is present between nodes.

The controller 140 may compare a candidate node within a predetermined distance based on the current node corresponding to the current location of the robot with the current node to check whether an edge is present.

When the edge is present, this may mean that a common feature is present between nodes and that feature matching is also possible. Subsequently, an edge connected to the edge corresponding to the current location is compared with node information on the existing map.

The controller 140 may check the node information on the existing map, and, when all edges connected to the node corresponding to the current location are consistent, may not register the node on the map, and may finish the process of determine whether to register the node on the map.

Meanwhile, when feature matching between images input from the camera sensor 120b fails, the controller 140 may perform iterative closest point (ICP) matching between the current node and an adjacent node based on sensing data of the LiDAR sensor 175 to add a correlation between nodes.

In addition, the controller 140 may use sensing data of the LiDAR sensor 175 for discrimination and creation of a correlation between nodes on the map creation and update process irrespective of whether feature matching between images is successful.

In this way, the controller 140 may create the map, and may recognize the current location of the mobile robot 100 based on the pre-stored map.

The present disclosure is technology capable of securing high location recognition performance in various environments, and realizes a location recognition algorithm using different kinds of sensors having different physical properties.

According to the present disclosure, different kinds of data are applied complementarily using image information of the camera sensor 120b and distance information of the LiDAR sensor 175. As a result, a shortcoming weak to low illuminance when only an image used in SLAM may be supplemented, and dynamic environmental correspondence caused when only the LiDAR sensor 175 is used may be supplemented.

SLAM technology may be divided into vision-based SLAM and laser-based SLAM.

In vision-based SLAM, a feature point is extracted from an image, three-dimensional coordinates are calculated through matching, and SLAM is performed based thereon. When an image has a lot of information and thus the environment is bright, excellent performance is exhibited in self-location recognition. However, in a dark place, operation is difficult, and there is a scale drift problem in which a small object present nearby and a large object present far away are recognized similarly.

In laser-based SLAM, the distance by angle is measured using a laser to calculate geometry in the surrounding environment. The laser-based SLAM works even in a dark environment. Since location is recognized using only geometry information, however, it may be difficult to find the own location thereof when there is no initial location condition in a space having a lot of repetitive areas, such as an office environment. In addition, it is difficult to correspond to a dynamic environment, such as movement of furniture.

That is, in vision-based SLAM, accurate operation is difficult in a dark environment (in an environment having no light). Also, in laser-based SLAM, self-location recognition is difficult in a dynamic environment (a moving object) and a repetitive environment (a similar pattern), accuracy in matching between the existing map and the current frame and loop closing is lowered, and it is difficult to make a landmark, whereby it is difficult to cope with a kidnapping situation.

In the present disclosure, features of different kinds of sensors, such as the camera sensor 120b and the LiDAR sensor 175 may be applied complementarily, whereby SLAM performance may be remarkably improved.

For example, in order to minimize errors accumulated when only wheel encoders are used, encoder information and the iterative closest point (ICP) result of the LiDAR sensor 175 may be combined to create odometry information.

In addition, 3D restoration may be performed through feature matching between input images based on the odometry information, and the current location (the amount of displacement of the robot) may be calculated, whereby it is possible to accurately estimate the current location.

In some embodiments, the estimated current location may be corrected to determine the final current location (S1170). For example, uncertainty of the estimated current location may be calculated considering surrounding geometry information based on sensing data of the LiDAR sensor 175, and correction may be performed in order to minimize the value of uncertainty, whereby it is possible to accurately determine the final current location. Here, uncertainty of the current location is a reliability value of the estimated current location, and may be calculated in the form of probability or dispersion. For example, uncertainty of the estimated current location may be calculated as covariance.

In addition, node information may be corrected using a node corresponding to the finally determined current location, and may be registered on the map.

In some embodiments, the controller 140 may include a LiDAR service module 1020 (see FIG. 12) for receiving sensing data of the LiDAR sensor 175 and discriminating the amount of location displacement using geometry information based on the sensing data of the LiDAR sensor 175 and previous location information, and a vision service module 1030 (see FIG. 12) for receiving the amount of location displacement from the LiDAR service module 1020, receiving an image from the camera sensor 120b, discriminating the location of a feature point through matching between a feature point extracted from the current image based on the amount of location displacement and a feature point extracted from the previous location, and estimating the current location based on the determined location of the feature point. Here, the amount of location displacement may be the traveling displacement.

Meanwhile, node information including the calculated current location information may be stored in the storage 130.

Meanwhile, the vision service module 1030 may transmit the node information to the LiDAR service module 1020, and the LiDAR service module 1020 may determine the amount of location displacement that the mobile robot 100 has moved while the vision service module 1030 calculates the current location in the node information to determine the current location of the mobile robot 100. That is, the current location may be corrected to determine the final current location (S1170).

The mobile robot 100 according to the embodiment of the present disclosure may include a traveling sensor for sensing the traveling state of the mobile robot based on the movement of the main body 110. For example, the mobile robot 100 may have a sensor, such as an encoder.

In this case, the controller 140 may further include a traveling service module 1010 (see FIG. 12) for reading sensing data of the traveling sensor, the traveling service module 1010 may transmit the sensing data of the traveling sensor to the LiDAR service module 1020, and the LiDAR service module 1020 may combine odometry information based on the sensing data of the traveling sensor and the ICP result of the LiDAR sensor 175 to create the odometry information.

The mobile robot 100 may perform loop closing based on a relative location between two adjacent nodes using graph-based SLAM technology. The controller 140 may correct location data of each node such that the sum of error values of correlations between nodes constituting a path graph is minimized.

In some embodiments, the controller 140 may calculate the current location based on sensing data of the LiDAR sensor 175 in an area having an illuminance less than a reference value, and may perform loop closing to correct an error when entering an area having an illuminance equal to or greater than the reference value. That is, LiDAR-based location recognition may be performed in a dark area having low illuminance. Since the LiDAR sensor 175 is not affected by illuminance, location recognition having the same performance is possible in a low-illuminance environment.

However, LiDAR-based SLAM has a shortcoming in that accuracy in loop closing is lowered. Consequently, loop closing may be performed after entering an area having sufficiently high illuminance. At this time, loop closing may be performed using image information acquired through the camera sensor 120b. That is, LiDAR-based SLAM may be performed in a low-illuminance environment, and vision-based SLAM, such as loop closing, may be performed in other environments.

A portion of the traveling zone may be dark, and a portion of the traveling zone may be bright. In this case, the mobile robot 100 according to the embodiment of the present disclosure creates a mode using only the LiDAR sensor 175 and calculates the own location thereof when passing a dark area. At this time, a location error may be accumulated. When the mobile robot 100 enters a bright area, all node information including node information of a node created based on vision through loop closing and node information of a node created based on LiDAR may be optimized to minimize the accumulated errors. When a dark area continues for a predetermined period of time, the velocity of the mobile robot 100 may be decreased or the mobile robot 100 may be stopped, exposure of the camera sensor 120b may be maximized to obtain an image that is as bright as possible, and then vision-based SLAM may be performed.

Meanwhile, each of the traveling service module 1010, the LiDAR service module 1020, and the vision service module 1030 may mean a software process or a main body that performs the software process.

Figure 12:
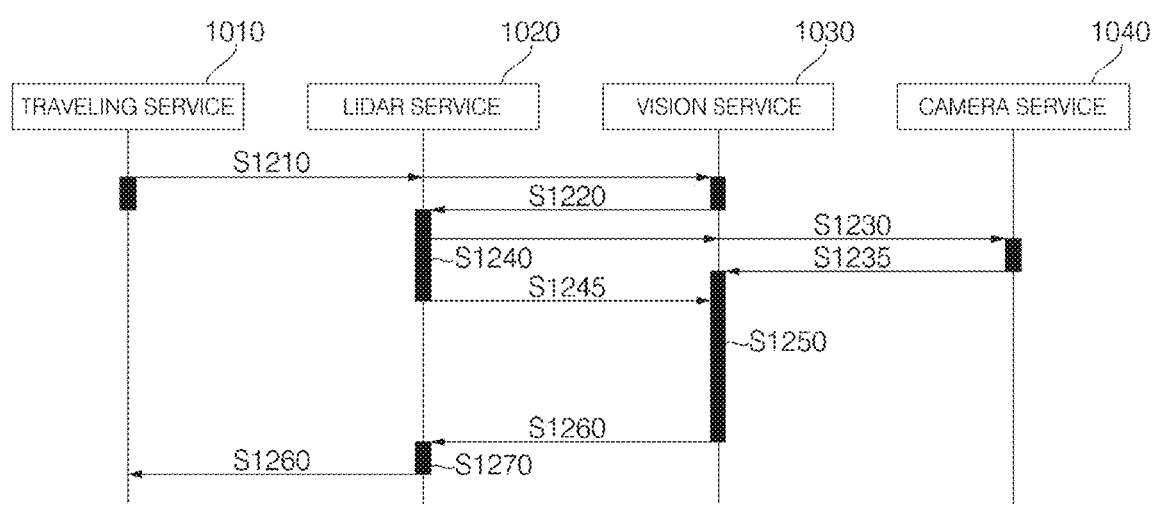
FIGS. 12 and 13 are flowcharts showing methods of controlling the mobile robot according to other embodiments of the present disclosure.
Figure 13:
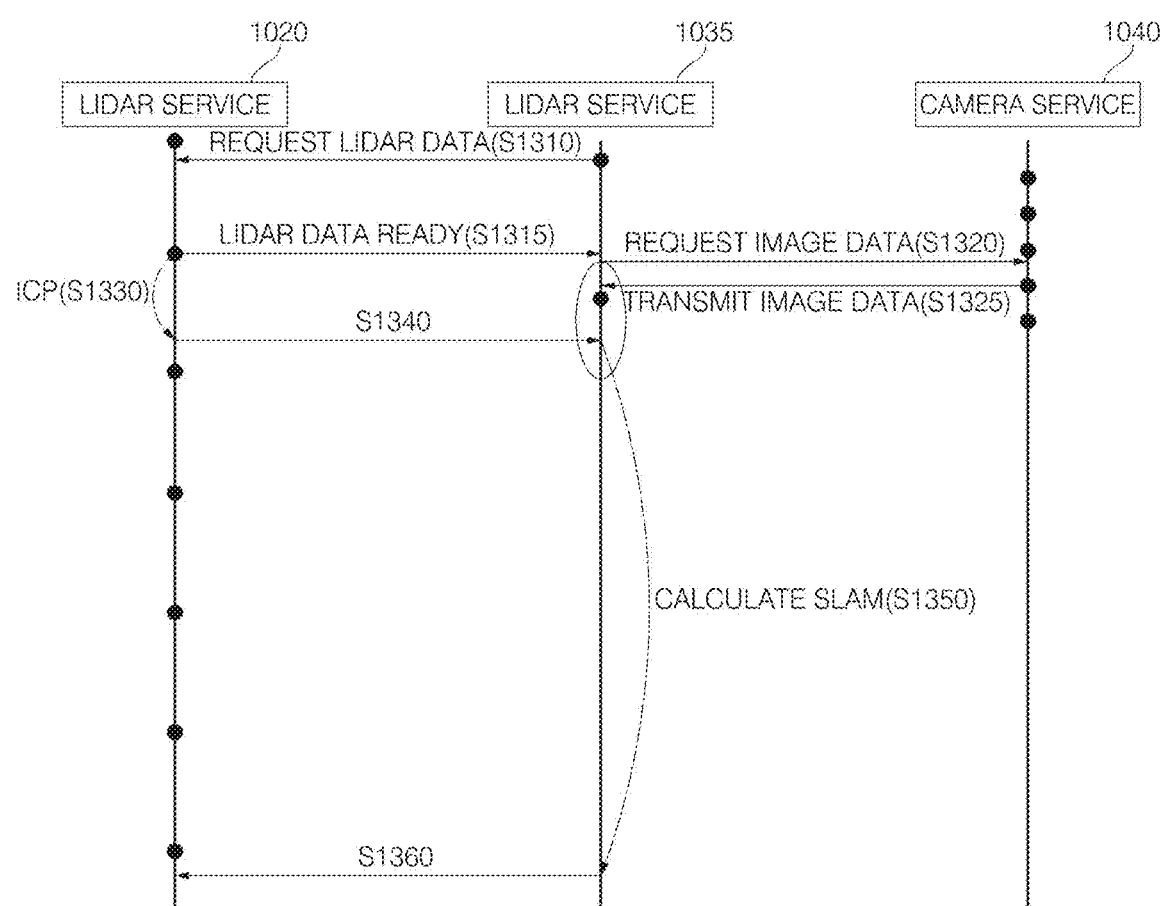

FIGS. 12 and 13 are flowcharts showing a software process of the method of controlling the mobile robot according to the embodiment of the present disclosure, and show a fusion sequence of vision and LiDAR. Here, each of the traveling service module 1010, the LiDAR service module 1020, and the vision service module 1030 may be a software process.

FIGS. 14 to 18 are reference views illustrating the method of controlling the mobile robot according to the embodiment of the present disclosure.

First, referring to FIG. 12, the traveling service module 1010 may transmit sensing data of the traveling sensor, such as an encoder, to the LiDAR service module 1020 and the vision service module 1030 (S1210).

The traveling state of the mobile robot based on the movement of the main body 110 may be sensed through the traveling sensor, and the traveling service module 1010 may transmit the sensing data of the traveling sensor to the LiDAR service module 1020 and the vision service module 1030 (S1210).

For example, the traveling service module 1010 may read the encoder valve of the wheel at a velocity of 50 Hz, and may transmit the same to the LiDAR service module 1020.

The vision service module 1030 may request odometry information from the LiDAR service module 1020 (S1220).

The LiDAR service module 1020 may respond to the request of the vision service module 1030 (S1225), and may create odometry information (S1240).

For example, the LiDAR service module 1020 may receive sensing data of the LiDAR sensor 175, and may determine the amount of location displacement of the mobile robot 100 using geometry information based on the received sensing data of the LiDAR sensor 175 and previous location information.

In addition, the LiDAR service module 1020 may combine odometry information based on the sensing data of the traveling sensor and the ICP result of the LiDAR sensor 175 to create odometry information, whereby the two data may not be used simply in parallel but may be used to accurately calculate odometry information.

Meanwhile, the vision service module 1030 may request image data from a camera service module 1040 for reading image information acquired by the image acquisition unit 120 (S1230), and may receive image data from the camera service module 1040 (S1235).

Meanwhile, the LiDAR service module 1020 may transmit information about the determined amount of location displacement to the vision service module 1030 (S1245).

The vision service module 1030 may receive information about the determined amount of location displacement from the LiDAR service module 1020 (S1245), may receive the image data from the camera service module 1040 (S1235), and may determine the location of a feature point through matching between a feature point extracted from the current image based on the amount of location displacement and a feature point extracted from the previous location (S1250), whereby an image feature point based on LiDAR-based odometry information may be matched (S1140).

Meanwhile, the controller 140 may register node information including the calculated current location information on the map, and may store the map having the added or updated node information in the storage 130.

Meanwhile, the vision service module 1030 may transmit the node information to the LiDAR service module 1020 (S1260), and the LiDAR service module 1020 may calculate the amount of location displacement that the mobile robot 100 has moved while the vision service module 1030 calculates the current location and may include the same in the received node information to determine the final current location of the mobile robot 100 (S1270). That is, the LiDAR service module 1020 may correct the current location estimated by the vision service module 1030 to determine the final current location (S1170 and S1270).

The LiDAR service module 1020 may register the node information corresponding to the determined final location on the map, or may output the same to another module in the controller 140 (S1280).

Referring to FIG. 13, a SLAM service module 1035 may perform a SLAM-related process as well as vision-based SLAM. When LiDAR-based SLAM is combined with vision-based SLAM, the SLAM service module 1035 may be realized to perform the function of the vision service module 1030.

Referring to FIGS. 12 and 13, the SLAM service module 1035 and the LiDAR service module 1020 may receive the encoder value of the wheel from the traveling service module 1010.

The SLAM service module 1035 may request LiDAR data from the LiDAR service module 1020 (S1310), and the LiDAR service module 1020 may transmit a response indicating that LiDAR data are ready to be provided to the SLAM service module 1035 (S1315).

The LiDAR service module 1020 may predict the current location based on the previous location of the mobile robot 100 and the encoder value of the wheel, may estimate the amount of location displacement and the current location using geometry information input from the LiDAR sensor 175 (S1330), and may transmit an estimated value to the SLAM service module 1035 (S1340).

In some embodiments, the LiDAR service module 1020 may transmit odometry information including the amount of location displacement and a probability value of uncertainty in the form of covariance to the SLAM service module 1035.

The SLAM service module 1035 may request an image from the camera service module 1040 (S1320). At this time, the SLAM service module 1035 may request image information corresponding to the encoder value received from the traveling service module 1010.

The SLAM service module 1035 may receive an image from the camera service module 1040 (S1325), and may calculate the location of a 3D feature point through matching between a feature point extracted from the current image based on the amount of location displacement input from the LiDAR service module 1020 and a feature point extracted from the previous location (S1350).

In addition, the SLAM service module 1035 may calculate the amount of displacement that the mobile robot 100 has moved and the current location based on the calculated 3D points (S1350).

Meanwhile, the SLAM service module 1035 may store the calculated result as node information having the form of a node.

Here, the stored node information may include node index information to be registered, global pose information (X, Y, θ), and a global uncertainty value.

In some embodiments, the SLAM service module 1035 stores the calculated result in the form of a node, and provides the node information to the LiDAR service module 1020 (S1360).

The LiDAR service module 1020 may add the location to which the mobile robot has moved during calculation of the SLAM service module 1035 to find out the current location of the robot.

LiDAR SLAM using sensing data of the LiDAR sensor 175 has an advantage in that this SLAM is not affected by change in illuminance.

Figure 14:
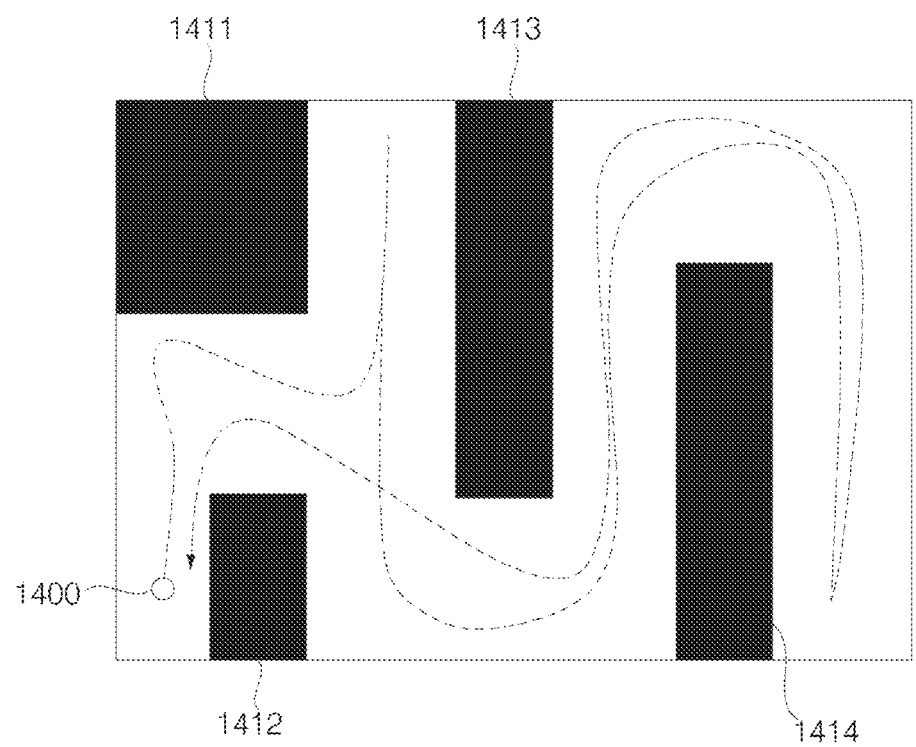
FIGS. 14 to 18 are reference views illustrating a method of controlling the mobile robot according to embodiments of the present disclosure.

In an environment A shown in FIG. 14, mapping and location recognition are possible using only LiDAR SLAM, and the LiDAR sensor 175 may be utilized as a sensor for sensing an obstacle and setting a traveling direction.

Since the environment A of FIG. 14 is an environment in which, after traveling while evading obstacles 1411, 1412, 1413, and 1414, the robot returns to the places to which the robot has moved, an error does not become bigger, whereby normal map creation is possible using only LiDAR SLAM.

Figure 15:
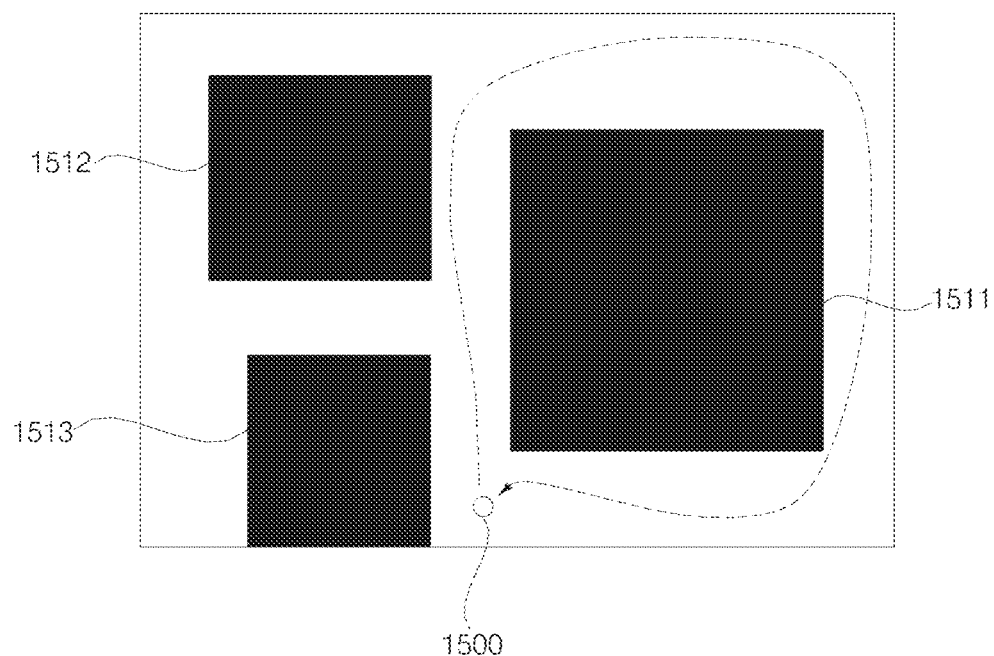

When only LiDAR SLAM is used, however, the mobile robot 100 continuously moves while looking at new places in an environment shown in FIG. 15, whereby an error becomes bigger. When the mobile robot 100 returns to the first departure point 1500 in this state, it is difficult to know whether the place at which the mobile robot is located is the first departure point.

The environment B of FIG. 15 is an environment in which at least one 1511 of a plurality of obstacles 1511, 1512, and 1513 is present in the center of a space while having a large size, and therefore it is difficult to create a map due to a problem of loop closing when only LiDAR SLAM is used.

Figure 16:
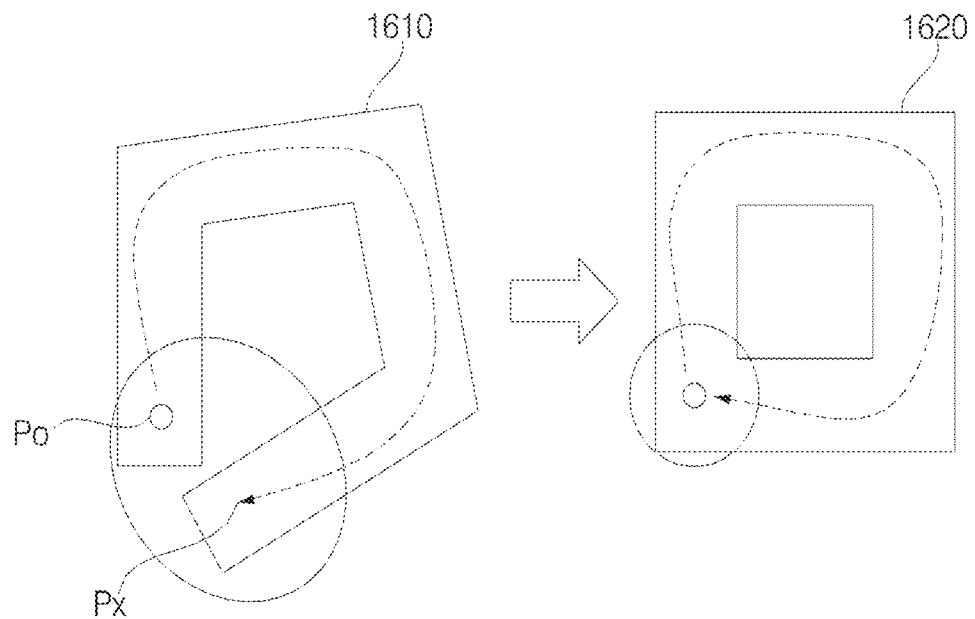

Referring to FIG. 16, the mobile robot 100 moves along a predetermined path 1610, may determine whether any one point Px coincides with the departure point Po, and, upon determining that they are the same points, may perform optimization for minimizing an error, whereby graph-based SLAM may be performed.

When the point Px coincides with the departure point Po, the error may be corrected according to an error correction algorithm to modify path information based on an accurate path 1620, whereby accurate location recognition and map preparation are possible.

In order to use LiDAR SLAM, therefore, accurate loop closing and error correction algorithms are necessary.

Meanwhile, in vision SLAM using an image acquired through the image acquisition unit 120, accurate loop closing is possible in both the environment A of FIG. 14 and the environment B of FIG. 15, whereby mapping and location recognition are possible.

In vision SLAM, however, performance may be change depending on illuminance, and therefore a difference in performance may be generated as the quantity of features detected from an image is reduced due to low illuminance. Particularly, if illuminance is very low, it is impossible to extract features from an acquired image, whereby mapping and location recognition may also be impossible.

A limitation in which operation is difficult in a low-illuminance environment when vision SLAM is used may be overcome through location recognition technology using the LiDAR sensor 175.

In addition, a map of LiDAR SLAM may be corrected by loop closing and error correction of vision SLAM, whereby it is possible to reduce a LiDAR mapping error in the environment B of FIG. 15.

According to the embodiment of the present disclosure, LiDAR SLAM using the LiDAR sensor 175 and vision SLAM using the image acquisition unit 120 may be utilized complementarily, whereby stable self-location recognition is possible in both a dark area and a bright area during movement of the robot.

Figure 17:
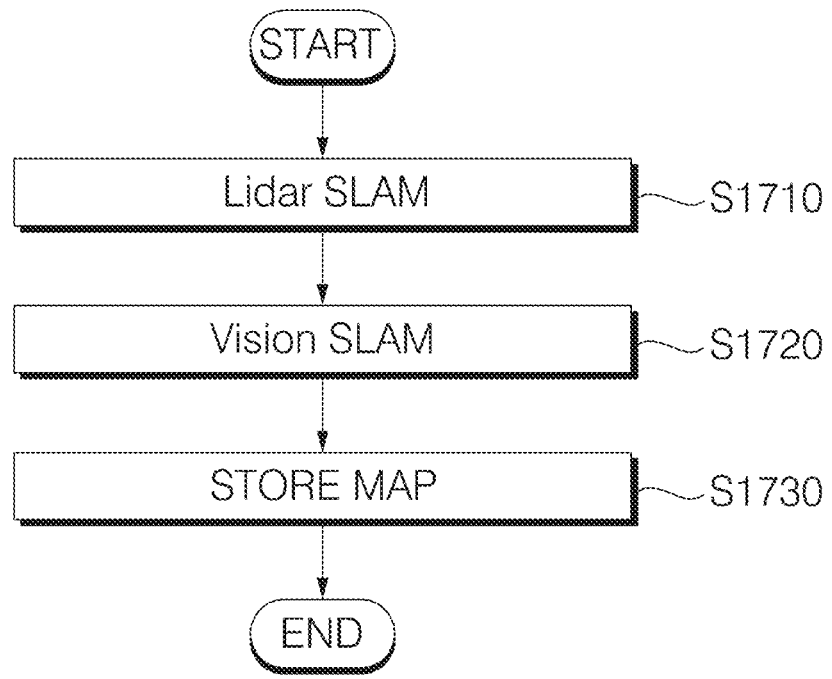

Referring to FIG. 17, LiDAR SLAM using the LiDAR sensor 175 may be performed first (S1710), vision SLAM having an advantage in loop closing may be performed (S1720), and a map may be created and stored (S1730).

That is, a map may be created using LiDAR SLAM (S1710), and the map created using LiDAR SLAM may be corrected through loop closing and error correction of vision SLAM (S1720), whereby a final map may be created (S1730).

Figure 18:
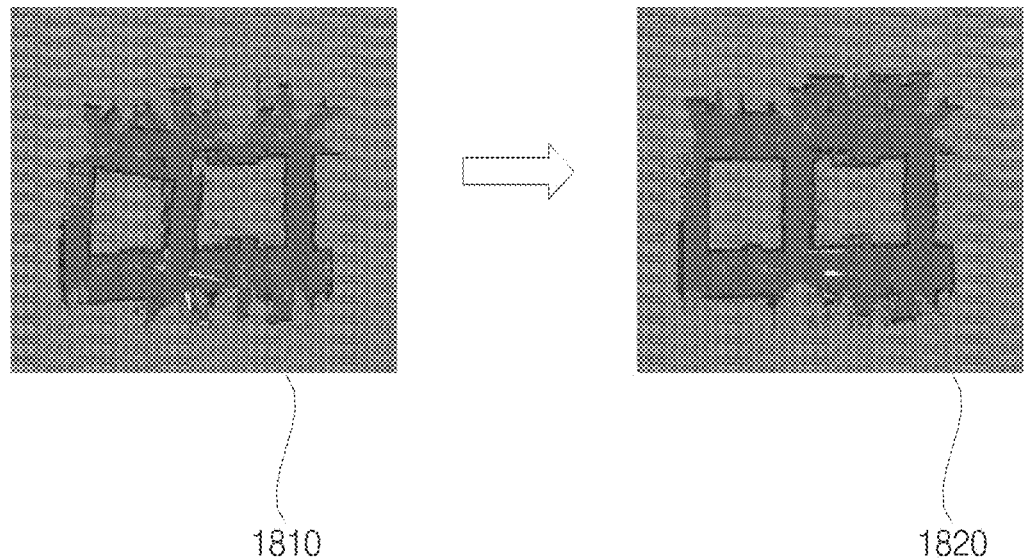

FIG. 18 illustrates a map 1810 created using LiDAR SLAM and a map 1820 on which loop closing and error correction has been performed.

Preferably, vision SLAM may be performed based on odometry information based on sensing data of the LiDAR sensor 175, as described with reference to FIGS. 1 to 13. In addition, the movement amount of the mobile robot 100 for a time necessary to perform a vision SLAM operation process may be additionally determined to determine the current location of the mobile robot 100.

According to the embodiment of the present disclosure, a correlation with adjacent nodes may be calculated by the LiDAR sensor 175 even when image-based feature matching is not successfully performed. That is, when image-based feature matching is not successfully performed, information may be provided to the LiDAR service module 1020, and the LiDAR service module 1020 may create a correlation (constraint). Consequently, optimization using more plentiful correlations is possible.

Even in a bright area, matching may be imperfect due to a limitation in feature matching between images. When matching is not successfully performed although the distance between the location considered by the vision service module 1030 and an adjacent node is a predetermined distance or less, therefore, the vision service module 1030 may further request a correlation from the LiDAR service module 1020.

The LiDAR service module 1020 may perform ICP matching between the current node and an adjacent node to add constraint. Constraint between nodes may be added therethrough, and therefore accurate location estimation is possible using constraints between many more nodes.

For odometry information calculated based on an image, scale drift may occur. When LiDAR-based geometry information is considered together, however, it is possible to minimize scale drift.

In addition, according to the embodiment of the present disclosure, it is possible to perform fusion SLAM without accurate calibration of a view point between image-based vision SLAM and LiDAR-based LiDAR SLAM.

Figure 19:
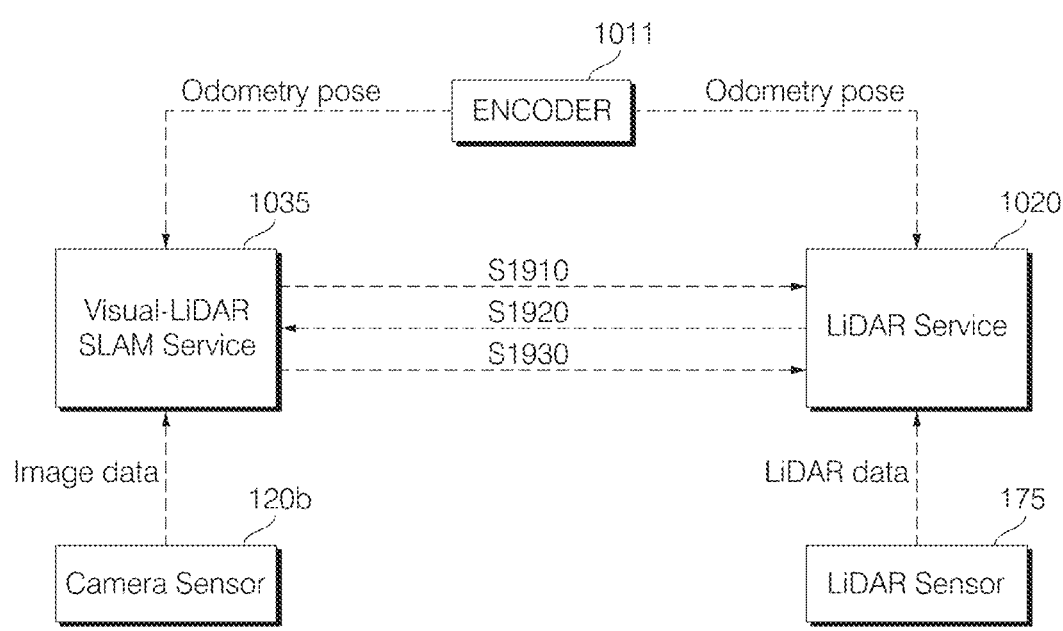
FIG. 19 is a reference view illustrating simultaneous localization and mapping (SLAM) according to an embodiment of the present disclosure.

FIG. 19 is a reference view illustrating SLAM according to an embodiment of the present disclosure, and shows an embodiment in which correlations based on data acquired by the camera sensor 120b and the LiDAR sensor 175, i.e. constraints, are optimized by the SLAM service module 1035, which is a SLAM framework.

The SLAM service module 1035 of FIG. 19 may perform a SLAM-related process as well as vision-based SLAM, may be realized to perform the function of the vision service module 1030, and may also be referred to as a visual-LiDAR SLAM service.

The SLAM service module 1035 may receive image data from the camera sensor 120b. In addition, the LiDAR service module 1020 may receive sensing data from the LiDAR sensor 175.

Meanwhile, the LiDAR service module 1020 and the SLAM service module 1035 may receive odometry information acquired by the traveling service module 1010 from the traveling service module 1010. For example, the encoder 1011 may transmit odometry information based on the operation of the wheel during traveling of the mobile robot 100 to the LiDAR service module 1020 and the SLAM service module 1035.

The SLAM service module 1035 may request information about the correlation acquired by the LiDAR service module 1020 from the LiDAR service module 1020 (S1910).

The SLAM service module 1035 may request information about location relative to the preceding frame from the LiDAR service module 1020. The information about location relative to the preceding frame, which is information about relative location from the preceding location to the current location of the mobile robot 100, may be the amount of location displacement or information obtained from the result of ICP matching.

In addition, the SLAM service module 1035 may request loop displacement (loop constraint) from the LiDAR service module 1020. For example, an index of a frame to be matched and loop displacement (loop constraint) matched within a local map range may be requested.

The LiDAR service module 1020 may respond to the request of the SLAM service module 1035 (S1920). For example, the LiDAR service module 1020 may provide information about location relative to the preceding frame and loop displacement (loop constraint) matched within the local map range to the SLAM service module 1035.

Meanwhile, the SLAM service module 1035 may combine constraints acquired from the camera sensor 120b and the LiDAR sensor 175.

The SLAM service module 1035 may combine the result of vision SLAM with information received from the LiDAR service module 1020 to update node information and to create a SLAM map.

The SLAM service module 1035 may determine the current corrected location, and may correct a pose-graph including pose of all nodes.

That is, the SLAM service module 1035 may determine the current location of the mobile robot 100, and may add, delete, or change node information of the SLAM map in order to create a SLAM map or to update the created SLAM map.

Meanwhile, the SLAM service module 1035 may transmit the current location of the mobile robot 100, corrected pose-graph information, frame index information equivalent for a local map corresponding to the current location, the current node, deleted node, and connection node information to the LiDAR service module 1020 (S1930).

Figure 20:
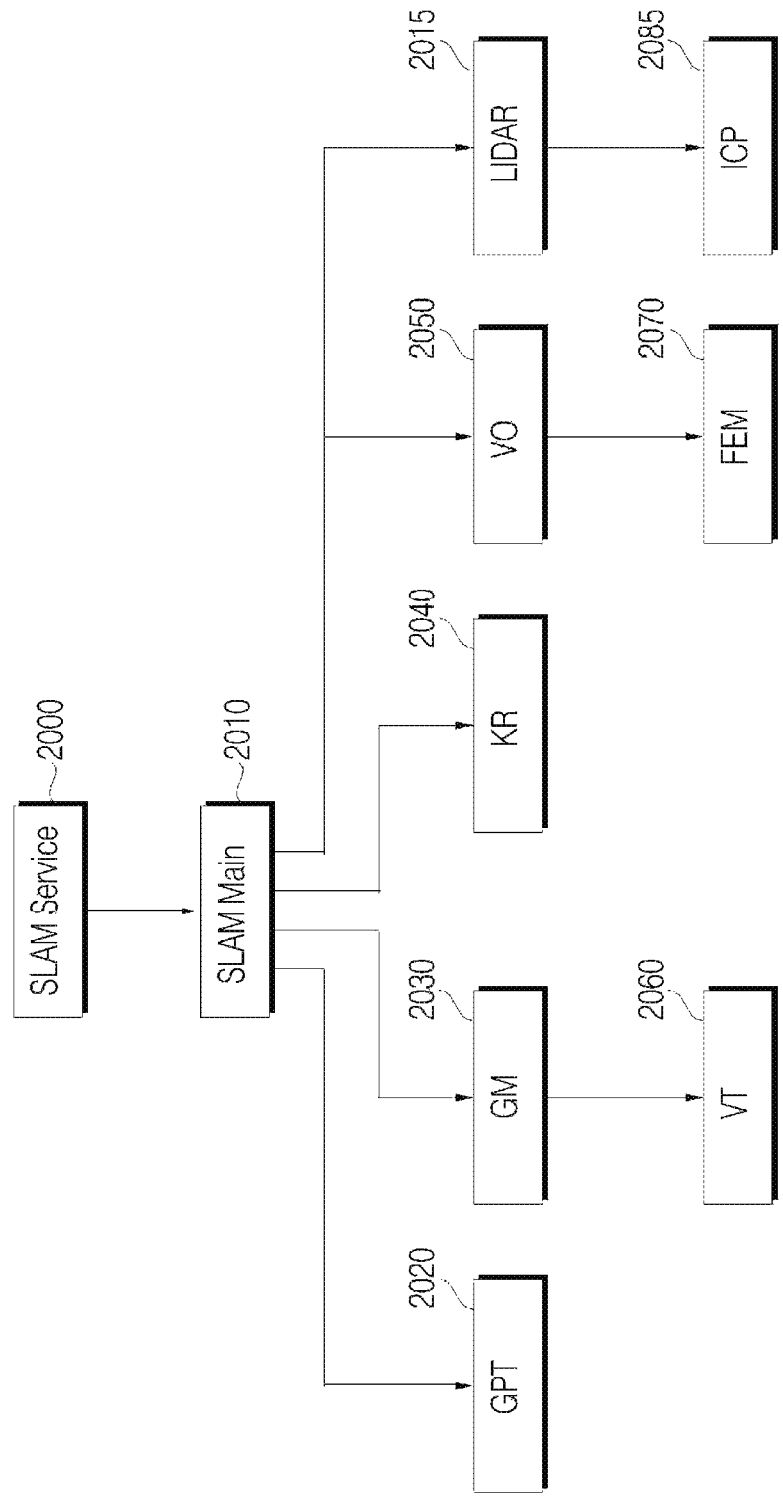
FIG. 20 is a reference view illustrating SLAM according to another embodiment of the present disclosure.

FIG. 20 is a reference view illustrating SLAM according to the embodiment of the present disclosure, and is a conceptual view showing the construction of a vision-LiDAR fusion SLAM service 2000.

The construction of the vision-LiDAR fusion SLAM service 2000 may be a software service, and vision SLAM and LiDAR SLAM may be different threads, which may operate asynchronously.

Consequently, inherent performance of vision SLAM and LiDAR SLAM may be basically secured, and these may be combined by the vision-LiDAR fusion SLAM service 2000, whereby it is possible to secure improved performance.

Referring to FIG. 20, a SLAM main 2010 may act as a hub for receiving data from each service module in the fusion SLAM service 2000, transmitting the same to a necessary service module, and receiving response therefrom.

Visual odometry (VO) 2050 may perform vision-based odometry discrimination for estimating the traveling distance from an image acquired by the camera sensor 120b.

The visual odometry 2050 may extract a feature point from the image acquired by the camera sensor 120b, and may perform feature extraction matching (FEM) 2070. For an image acquired in a low-illuminance environment, feature extraction 2070 matching may be difficult.

Preferably, therefore, a LiDAR service module 2015 performs ICP matching 2085 to acquire odometry information, and fusion SLAM is performed based thereon.

In this way, within the local map range, global pose may be determined using odometry information acquired through the visual odometry 2050 and/or odometry information acquired through ICP matching 2085.

For example, a global pose tracker (GPT) 2020 may read the odometry information to determine global pose.

Meanwhile, a global mapper (GM) 2030 may collect and optimize information determined within the local map range. In addition, the global mapper 2030 may create a vocabulary tree (VT) 2060, which is a feature point dictionary.

Meanwhile, a kidnap recovery (KR) 2040 may collect and optimize information determined within the local map range.

The SLAM main 2010 may obtain loop displacement (loop constraint) from the global pose tracker 2020. In addition, the SLAM main 2010 may transmit a new frame, the amount of location displacement, and loop displacement (loop constraint) to a thread of the global mapper 2030.

The SLAM main 2010 may obtain feature point information and corrected location of the new frame from the visual odometry 2050, and may match the new frame with a pose-graph node of the global mapper 2030 to create loop displacement (loop constraint).

The global pose tracker 2020 may perform location estimation, and the SLAM main 2010 may update node information of the pose-graph based on the estimated location information.

The SLAM main 2010 may determine the current corrected location, and may correct a pose-graph including pose of all nodes.

The SLAM main 2010 may determine the current location of the mobile robot 100, and may add, delete, or change node information of the SLAM map in order to create a SLAM map or to update the created SLAM map.

The mobile robot according to the present disclosure and the method of controlling the same are not limitedly applied to the constructions and methods of the embodiments as previously described; rather, all or some of the embodiments may be selectively combined to achieve various modifications.

Similarly, although operations are shown in a specific sequence in the drawings, this does not mean that the operations must be performed in the specific sequence or sequentially in order to obtain desired results or that all of the operations must be performed. In a specific case, multitasking and parallel processing may be advantageous.

Meanwhile, the method of controlling the mobile robot according to the embodiment of the present disclosure may be implemented as code that can be written on a processor-readable recording medium and thus read by a processor. The processor-readable recording medium may be any type of recording device in which data is stored in a processor-readable manner. The processor-readable recording medium may include, for example, read only memory (ROM), random access memory (RAM), compact disc read only memory (CD-ROM), magnetic tape, a floppy disk, and an optical data storage device, and may be implemented in the form of a carrier wave transmitted over the Internet. In addition, the processor-readable recording medium may be distributed over a plurality of computer systems connected to a network such that processor-readable code is written thereto and executed therefrom in a decentralized manner.

As is apparent from the above description, according to at least one of the embodiments of the present disclosure, it is possible to create a map robust to various environmental changes, such as changes in lighting, illuminance, time zone, and object location, by combining different kinds of data acquired utilizing different kinds of sensors.

In addition, according to at least one of the embodiments of the present disclosure, it is possible to accurately recognize the location of a mobile robot on a map robust to various environmental changes by complementarily using different kinds of data acquired utilizing different kinds of sensors.

In addition, according to at least one of the embodiments of the present disclosure, it is possible to realize SLAM technology robust to various environmental changes, such as changes in illuminance and object location, by effectively combining vision-based location recognition technology using a camera and LiDAR-based location recognition technology using a laser.

In addition, according to at least one of the embodiments of the present disclosure, it is possible to perform efficient traveling and cleaning based on a single map capable of coping with various environmental changes and accurate location recognition.

Various other effects of the present disclosure are directly or suggestively disclosed in the above detailed description of the disclosure.

It will be apparent that, although the preferred embodiments have been shown and described above, the present disclosure is not limited to the above-described specific embodiments, and various modifications and variations can be made by those skilled in the art without departing from the gist of the appended claims. Thus, it is intended that the modifications and variations should not be understood independently of the technical spirit or prospect of the present disclosure.

What is claimed is:

1. A mobile robot comprising:
a traveling unit configured to move a main body;
a LiDAR sensor configured to acquire geometry information;
a camera sensor configured to acquire images of an outside of the main body; and
a controller configured to:
generate odometry information based on the geometry information acquired by the LiDAR sensor; and
perform feature matching between images acquired by the camera sensor based on the odometry information to estimate a current location of the mobile robot and, wherein the controller comprises:
a LiDAR service module configured to:
receive the geometry information acquired by the LiDAR sensor; and
determine an amount of location displacement using the geometry information and previous location information; and
a vision service module configured to:
receive the amount of location displacement from the LiDAR service module;
receive an image from the camera sensor;
determine a location of a feature point by matching a first feature point extracted from the image based on the amount of location displacement and a second feature point extracted from a previous location; and
determine the current location of the mobile robot based on the determined location of the feature point,
and wherein the vision service module is configured to transmit node information comprising the determined current location to the LiDAR service module, and
the LiDAR service module is configured to:
determine an additional amount of location displacement by which the mobile robot has moved during a time taken by the vision service module to determine the current location; and
include the additional amount of location displacement in the node information.

2. The mobile robot according to claim 1, further comprising:
a traveling sensor configured to sense a traveling state based on movement of the main body, the traveling state including a distance traveled by the mobile robot, wherein
the controller is configured to:
perform an iterative closest point (ICP) matching on the geometry information acquired by the LiDAR sensor; and
combine the traveling state sensed by the traveling sensor with a result of the ICP matching to generate the odometry information.

3. The mobile robot according to claim 1, further comprising a storage configured to store the node information comprising the determined current location.

4. The mobile robot according to claim 3, further comprising:
a traveling sensor configured to sense a traveling state based on movement of the main body, the traveling state including a distance traveled by the mobile robot, wherein
the controller further comprises a traveling service module configured to receive the traveling state sensed by the traveling sensor,
the traveling service module is configured to transmit the traveling state to the LiDAR service module, and
the LiDAR service module is configured to generate the odometry information by combining the traveling state sensed by the traveling sensor and an ICP result obtained by performing ICP on the geometry information acquired by the LiDAR sensor.

5. The mobile robot according to claim 1, wherein the controller is configured to:
determine the current location of the mobile robot based on the geometry information acquired by the LiDAR sensor in an area having an illuminance less than a reference value; and
perform a loop closing to correct an error when the mobile robot enters an area having an illuminance equal to or greater than the reference value.

6. The mobile robot according to claim 1, wherein the controller is configured to generate a correlation between nodes by performing an iterative closest point (ICP) matching between a current node and an adjacent node based on the geometry information acquired by the LiDAR sensor, when feature matching between images acquired by the camera sensor fails.

7. A method of controlling a mobile robot, the method comprising:
acquiring geometry information using a LiDAR sensor;
acquiring images of an outside of the main body using a camera sensor;
creating odometry information based on the geometry information acquired by the LiDAR sensor;
performing feature matching between images acquired by the camera sensor based on the odometry information; and
determining a current location of the mobile robot based on a result of the feature matching, wherein performing the feature matching comprises:

a vision service module of the controller receiving an amount of location displacement from a LiDAR service module;

the vision service module receiving an image from the camera sensor;

the vision service module determining a location of a feature point by matching a first feature point extracted from the image based on the amount of location displacement and a second feature point extracted from the previous location; and the vision service module transmitting node information comprising the determined current location to the LiDAR service module;

the LiDAR service module determining an additional amount of location displacement by which the mobile robot has moved during a time period in which the vision service module determines the current location of the mobile robot; and the LiDAR service module including the additional amount of location displacement in the node information.

8. The method according to claim 7, further comprising determining an uncertainty in the current location based on geometry information acquired by the LiDAR sensor.

9. The method according to claim 7, further comprising:
sensing a traveling state using a traveling sensor, the traveling state including a distance traveled by the mobile robot; and matching the traveling state and the geometry information acquired by the LiDAR sensor based on an iterative closest point (ICP) algorithm.

10. The method according to claim 9, wherein generating the odometry information comprises combining the traveling state sensed by the traveling sensor and a result of the ICP algorithm.

11. The method according to claim 7, wherein generating the odometry information comprises:

the LiDAR service module of a controller receiving the geometry data acquired by the LiDAR sensor; and the LiDAR service module determining an amount of location displacement using the geometry data and previous location information.

12. The method according to claim 7, further comprising storing the node information comprising the calculated current location information in a storage.

13. The method according to claim 7, further comprising:
sensing a traveling state using a traveling sensor, the traveling state including a distance traveled by the mobile robot, wherein generating the odometry information comprises the LiDAR service module combining odometry information based on traveling state sensed by the traveling sensor and an ICP result obtained by performing ICP on the geometry information acquired by the LiDAR sensor.

14. The method according to claim 13, further comprising the traveling service module of the controller transmitting the travel state sensed by the traveling sensor to the LiDAR service module.

15. The method according to claim 7, further comprising:
determining the current location based on the geometry information acquired by the LiDAR sensor in an area having an illuminance less than a reference value; and performing a loop closing to correct an error when the main body of the mobile robot moves and enters an area having an illuminance equal to or greater than the reference value.

16. The method according to claim 7, further comprising, performing iterative closest point (ICP) matching between a current node and an adjacent node based on the geometry information acquired by the LiDAR sensor to generate a correlation between nodes, when feature matching between images input from the camera sensor fails.

* * * * *